(12) United States Patent
Shokri Razaghi et al.

(10) Patent No.: US 10,985,899 B2
(45) Date of Patent: Apr. 20, 2021

(54) NETWORK NODE, WIRELESS DEVICE AND METHODS THEREIN RELATING TO TIME DIVISION DUPLEX CONFIGURATIONS FOR NARROWBAND INTERNET OF THINGS

(71) Applicant: Telefonaktiebolaget LM Ericsson (publ), Stockholm (SE)

(72) Inventors: Hazhir Shokri Razaghi, Solna (SE); Ali Behravan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/324,625

(22) PCT Filed: Jun. 30, 2017

(86) PCT No.: PCT/SE2017/050739
§ 371 (c)(1),
(2) Date: Feb. 11, 2019

(87) PCT Pub. No.: WO2018/030936
PCT Pub. Date: Feb. 15, 2018

(65) Prior Publication Data
US 2019/0182021 A1 Jun. 13, 2019

Related U.S. Application Data
(60) Provisional application No. 62/373,812, filed on Aug. 11, 2016.

(51) Int. Cl.
*H04L 5/14* (2006.01)
*H04L 29/08* (2006.01)
*H04L 5/00* (2006.01)

(52) U.S. Cl.
CPC ............ *H04L 5/1469* (2013.01); *H04L 67/10* (2013.01); *H04L 5/0016* (2013.01)

(58) Field of Classification Search
None
See application file for complete search history.

(56) References Cited

U.S. PATENT DOCUMENTS

2016/0127032 A1* 5/2016 Kim ................. H04B 7/185
455/427
2016/0242170 A1* 8/2016 Xu ..................... H04W 4/70
(Continued)

OTHER PUBLICATIONS

3GPP TSG-RAN WG1 NB-IoT AdHoc; Budapest, Hungary; Source: Nokia Networks; Title: On the TDD Support for NB-IoT (R1-160011)—Jan. 18-20, 2016.
(Continued)

*Primary Examiner* — Ajit Patel
(74) *Attorney, Agent, or Firm* — Baker Botts, LLP

(57) ABSTRACT

A method in a network node is provided. The method comprises determining (1304) a frame structure configuration for a narrowband Internet of Things (NB-IoT) system operating in time division duplex (TDD) mode. The frame structure comprises a plurality of subframes. The plurality of subframes comprises at least one of each of a downlink subframe, an uplink subframe, and a special subframe comprising a gap period during which no transmission occurs. The plurality of subframes is arranged such that the frame structure configuration is compatible with an uplink configuration of the NB-IOT system, e.g. having a subcarrier spacing of 3.75 kHz. The method further comprises communicating the determined frame structure configuration to a wireless device operating in the NB-IoT system.

17 Claims, 19 Drawing Sheets

(56) References Cited

U.S. PATENT DOCUMENTS

| 2018/0124749 | A1* | 5/2018 | Park | H04W 74/08 |
| 2018/0145802 | A1* | 5/2018 | Hwang | H04L 5/0048 |
| 2018/0270848 | A1* | 9/2018 | Liang | H04W 72/1289 |
| 2019/0074918 | A1* | 3/2019 | Huang | H04B 17/382 |
| 2019/0165922 | A1* | 5/2019 | Chavva | H04L 1/1854 |

OTHER PUBLICATIONS

PCT Notification of Transmittal of the International Search Report and the Written Opinion of the International Searching Authority, or the Declaration for International application No. PCT/SE2017/050739—dated Sep. 4, 2017.
3GPP TS 36.211 v13.0.0; Technical Specification; 3rd Generation Partnership Project; Technical Specification Group Radio Access Network; Evolved Universal Terrestrial Radio Access (E-UTRA); Physical channels and modulation (Release 13)—Dec. 2015.
PCT Written Opinion of the International Searching Authority for International application No. PCT/SE2017/050739—dated Sep. 4, 2017.
3GPP TSG RAN WG1 NB-IoT Ad-Hoc Meeting; Budapest, Hungary; Source: MediaTek Inc.; Title: Frame structure design for 3.75kHz (R1-160163)—Jan. 18-20, 2016.
3GPP TSG-GERAN Meeting #62; Valencia, Spain; Source: Vodafone Group Plc.; Title: New Study Item on Cellular System Support for Ultra Low Complexity and Low Throughput Internet of Things (GP-140421 (rev of GP-140418 rev of GP-140411))—May 26-30, 2014.
3GPP/PCG#34 Meeting; Sophia Antipolis, France; Source: Secretary; Title: Revised Draft Summary minutes; decisions and actions from 3GPP PCG Meeting #34, held in Sophia Antipolis, France, on Apr. 28, 2015 (3GPP PCG#34(15)41r1—Oct. 2015.

* cited by examiner

NETWORK NODE, WIRELESS DEVICE AND METHODS THEREIN RELATING TO TIME DIVISION DUPLEX CONFIGURATIONS FOR NARROWBAND INTERNET OF THINGS

PRIORITY

This nonprovisional application is a U.S. National Stage Filing under 35 U.S.C. § 371 of International Patent Application Serial No. PCT/SE2017/050739 filed Jun. 30, 2017 and entitled "NETWORK NODE, WIRELESS DEVICE AND METHODS THEREIN RELATING TO TIME DIVISION DUPLEX CONFIGURATIONS FOR NARROWBAND INTERNET OF THINGS" which claim priority to U.S. Provisional Patent Application No. 62/373,812 filed Aug. 11, 2016 both of which are hereby incorporated by reference in their entirety.

TECHNICAL FIELD

The present disclosure relates, in general to a network node, a wireless device and methods therein, and, more particularly, to Time Division Duplex configurations for Narrowband Internet of Things.

BACKGROUND

1.1 Time Division Duplex (TDD) Systems

FIG. 1 illustrates the seven different DL/UL configurations that are defined for Long Term Evolution (LTE)-TDD systems. An essential feature of TDD systems is that they allow for asymmetric downlink/uplink (DL/UL) allocations and thus, the possibility to adjust the used time-frequency resources in terms of instantaneous traffic. One radio frame is 10 ms and comprises any of the seven configurations:

Configuration 0: DL:UL 2:3
Configuration 1: DL:UL 3:2
Configuration 2: DL:UL 4:1
Configuration 3: DL:UL 7:3
Configuration 4: DL:UL 8:2
Configuration 5: DL:UL 9:1
Configuration 6: DL:UL 5:5

The DL/UL allocations may correspond to one of the seven different DL/UL configurations that are defined for LTE-TDD systems shown in FIG. 1. This is in contrast to Frequency Division Duplex (FDD) systems, in which a bandwidth is either allocated to DL or UL operations regardless of the traffic pattern and the need at a certain node.

1.2 Narrowband Internet of Things (NB-IoT)

In GERAN #62, a study item on "Cellular System Support for Ultra Low Complexity and Low Throughput Internet of Things" was approved. The aim was to study both the possibility of evolving the current GERAN system and the design of a new access system geared towards low-complexity and low-throughput radio access technology to address the requirements of cellular internet of things. The objectives of the study include: improved indoor coverage, support for a massive number of low-throughput devices, low delay sensitivity, ultra-low device cost, low device power consumption and (optimized) network architecture. As per the PCG #34 decisions, it was agreed to move the normative phase of a single "clean-slate solution" to 3GPP LTE. This feature is referred to as NB-IOT.

3GPP LTE represents the project within the Third Generation Partnership Project, with an aim to improve the Universal Mobile Telecommunications System (UMTS) standard. The 3GPP LTE radio interface offers high peak data rates, low delays and increased spectral efficiencies. The LTE ecosystem supports both FDD and TDD. This enables operators to exploit both the paired and unpaired spectrum, since LTE has flexibility in bandwidth. LTE supports six bandwidths: 1.4 MHz, 3 MHz, 5 MHz, 10 MHz, 15 MHz and 20 MHz.

The objective of this new work item on NB-IoT is to specify a radio access system for cellular internet of things, based to a great extent on a non-backward-compatible variant of Evolved-Universal Terrestrial Radio Access (E-UTRA), which addresses improved indoor coverage, support for a massive number of low-throughput devices, low delay sensitivity, ultra-low device cost, low device power consumption and (optimized) network architecture.

NB-IoT should support 3 different modes of operation:

1. "Stand-alone operation" utilizing, for example, the spectrum currently being used by GERAN systems as a replacement of one or more GSM carriers. In principle, "stand-alone operation" operates on any carrier frequency that is neither within the carrier of another system nor within the guard band of another system's operating carrier. The other system can be another NB-IoT operation, or any other Radio Access Technology (RAT) (e.g., LTE).

2. "Guard band operation" utilizing the unused resource blocks (RBs) within a LTE carrier's guard-band. The term guard band may also be interchangeably referred to as guard bandwidth.

3. "In-band operation" utilizing RBs within a normal LTE carrier. The in-band operation may also be interchangeably referred to as "in-bandwidth operation."

In NB-IoT, the DL transmission is based on Orthogonal Frequency Division Multiplexing (OFDM) with 15 kHz subcarrier spacing for all the scenarios: standalone, guard-band, and in-band. For the UL transmission, both multi-tone transmissions based on Single-Carrier Frequency Division Multiple Access (SC-FDMA), and single tone transmission are supported. Multi-tone transmissions are based on SC-FDMA with 15 kHz UL subcarrier spacing. For single tone transmissions, two numerologies can be configurable by the network: 3.75 kHz and 15 kHz. A cyclic prefix is inserted.

This means that the physical waveforms for NB-IoT in DL and also partly in UL are similar to legacy LTE.

In the DL design, NB-IoT supports both master information broadcast and system information broadcast, which are carried by different physical channels. For in-band operation, it is possible for a NB-IoT user equipment (UE) to decode Narrowband Physical Broadcast Channel (NPBCH) without knowing the legacy physical resource block (PRB) index. NB-IoT supports both DL physical control channel (e.g., Narrowband Physical Downlink Control Channel (NPDCCH)) and DL physical shared channel (e.g., Physical Downlink Shared Channel (PDSCH)). The operation mode of NB-IoT must be indicated to the UE. Currently, 3GPP is considering indication by means of Narrowband Secondary Synchronization Signal (NSSS), Narrowband Master Information Block (NB-MIB), or perhaps other DL signals.

NB-IoT supports the physical broadcast channel (e.g., NPBCH), the physical downlink control channel (e.g., NPDCCH), the physical downlink shared channel (e.g., PDSCH), the physical uplink control channel (e.g., Narrowband Physical Uplink Shared Channel (NPUSCH)), and the physical random access channel (e.g., Narrowband Physical Random Access Channel (NPRACH)).

The general design principle of NB-IoT follows that of legacy LTE. DL synchronization signals consist of the Narrowband Primary Synchronization Signal (NPSS) and the NSSS. The periodicity of NPSS transmission is 10 ms. The periodicity of NSSS has not been determined. Also, cell specific reference symbols (e.g., Narrowband Reference Symbols (NRS)) are defined for NB-IoT.

FIG. 2 shows the NRS reference symbols for different operation modes. More particularly, FIG. 2 illustrates the cell-specific reference symbols for NB-IoT for the in-band scenario and the guard-band/stand-alone scenarios.

NB-IoT standardization has been introduced and finalized in 3GPP Release 13. However, due to time constraints some of the major aspects of the cellular systems that seem to be in demand by the market have not been studied and standardized. An important aspect of these features that have not been included is TDD mode. The standard only defines the operation for FDD for NB-IoT. Previous releases of LTE, however, have also defined TDD operation mode. This is a considerable drawback because NB-IoT cannot be used for the spectrums that are determined only for a TDD cellular network.

The FDD design that has been specified for NB-IoT cannot be directly applied to TDD modes. In this regard, the main and foremost part of TDD that is different from FDD is the frame and subframe configurations. Compared to legacy LTE Mobile Broadband (MBB) and enhanced Machine Type Communication (eMTC), the NB-IoT uplink has adopted different numerologies in terms of subcarrier spacing and symbol size. This new design imposes some constraints on the frame and subframe configurations that need to be taken into account for NB-IoT TDD structure. As a result, not all of the legacy LTE frame and subframe configurations can be used for TDD NB-IoT. With respect to those configurations that can be reused, proper modification needs to be applied in order to have efficient use of resources.

SUMMARY OF EXAMPLE EMBODIMENTS

According to one example embodiment, a method in a network node is disclosed. The method comprises determining a frame structure configuration for a narrowband internet of things (NB-IoT) system operating in time division duplex (TDD) mode, the frame structure comprising a plurality of subframes, the plurality of subframes comprising at least one of each of a downlink subframe, an uplink subframe, and a special subframe comprising a gap period during which no transmission occurs, wherein the plurality of subframes are arranged such that the frame structure configuration is compatible with an uplink configuration of the NB-IOT system, e.g. having a subcarrier spacing of 3.75 kHz. The method comprises communicating the determined frame structure configuration to a wireless device operating in the NB-IoT system.

In certain embodiments, determining the frame structure configuration for the NB-IoT system may comprise adapting a legacy LTE frame structure to be compatible with the uplink configuration of the NB-IoT system. In certain embodiments, the frame structure configuration may comprise integer contiguous uplink subframes having a slot duration that is a multiple of 2 ms. In some cases, the frame structure configuration may be determined from a plurality of possible frame structure configurations, and the method may comprise restricting the plurality of possible frame structure configurations from which the frame structure configuration is determined to one or more legacy frame structure configurations comprising integer contiguous uplink subframes having a slot duration that is a multiple of 2 ms. In some cases, the frame structure configuration may comprise a single special subframe. In some cases, any one out of a second subframe and a third subframe of the frame structure configuration may be the special subframe.

In certain embodiments, the special subframe may comprise a Downlink Pilot Time Slot (DwPTS) and an Uplink Pilot Time Slot (UpPTS), and the UpPTS may have a duration that is an integer multiple of a 3.75 kHz symbol duration, the 3.75 kHz symbol duration equal to a duration of four 15 kHz Single Carrier Frequency Division Multiple Access (SC-FDMA) symbols. In some cases, the UpPTS may have a duration of one 3.75 kHz symbol. In some cases, the UpPTS has a duration of two 3.75 kHz symbols. In some cases, the UpPTS may have a duration of three 3.75 kHz symbols. In certain embodiments, the special subframe may not include an Uplink Pilot Time Slot (UpPTS).

In certain embodiments, the frame structure configuration may comprise an odd number of uplink subframes, and may comprise a particular uplink subframe that is not part of an integer contiguous grouping of uplink subframes having a slot duration that is a multiple of 2 ms. The particular uplink subframe may have a slot duration of 1 ms, wherein each slot includes three 3.75 kHz symbols. In certain embodiments, the method may comprise configuring the wireless device to truncate uplink transmission using the particular uplink subframe.

In certain embodiments, the plurality of subframes may comprise at least three downlink subframes via which the wireless device can receive one or more reference signals and a control channel. In some cases, the one or more reference signals may comprise a Narrowband Primary Synchronization Signal and a Narrowband Secondary Synchronization Signal, and the control channel may comprise a Narrowband Physical Broadcast Channel. In some cases, the frame structure configuration may be determined from a plurality of possible frame structure configurations, and the method may comprise restricting the plurality of possible frame structure configurations from which the frame structure configuration is determined to one or more legacy frame structure configurations comprising at least three downlink subframes via which the wireless device can receive the one or more reference signals and the control channel.

According to another example embodiment, a network node is disclosed. The network node comprises one or more processors. The one or more processors are configured to determine a frame structure configuration for a narrowband internet of things (NB-IoT) system operating in time division duplex (TDD) mode, the frame structure comprising a plurality of subframes, the plurality of subframes comprising at least one of each of a downlink subframe, an uplink subframe, and a special subframe comprising a gap period during which no transmission occurs, wherein the plurality of subframes are arranged such that the frame structure configuration is compatible with an uplink configuration of the NB-IOT system e.g. having a subcarrier spacing of 3.75 kHz. The one or more processors are configured to communicate the determined frame structure configuration to a wireless device operating in the NB-IoT system.

According to another example embodiment, a method in a wireless device is disclosed. The method comprises receiving a frame structure configuration for a narrowband internet of things (NB-IoT) system operating in time division duplex (TDD) mode, the frame structure comprising a plurality of subframes, the plurality of subframes comprising at least one of each of a downlink subframe, an uplink subframe, and a special subframe comprising a gap period during which no transmission occurs, wherein the plurality of subframes are arranged such that the frame structure configuration is compatible with an uplink configuration of the NB-IOT system, e.g. having a subcarrier spacing of 3.75 kHz. The method comprises performing receive or transmit operations according to the received frame structure configuration.

In certain embodiments, the frame structure configuration may comprise integer contiguous uplink subframes having a slot duration that is a multiple of 2 ms. In some cases, the frame structure configuration may be determined from a plurality of possible frame structure configurations, and the plurality of possible frame structure configurations from which the frame structure configuration is determined may be restricted to one or more legacy frame structure configurations comprising integer contiguous uplink subframes having a slot duration that is a multiple of 2 ms. In some cases, the frame structure configuration may comprise a single special subframe. In some cases, any one out of a second subframe and a third subframe of the frame structure configuration may be the special subframe.

In certain embodiments, the special subframe may comprise a Downlink Pilot Time Slot (DwPTS) and an Uplink Pilot Time Slot (UpPTS). The UpPTS may have a duration that is an integer multiple of a 3.75 kHz symbol duration, the 3.75 kHz symbol duration equal to a duration of four 15 kHz Single Carrier Frequency Division Multiple Access (SC-FDMA) symbols. In some cases, the UpPTS may have a duration of one 3.75 kHz symbol. In some cases, the UpPTS may have a duration of two 3.75 kHz symbols. In some cases, the UpPTS may have a duration of three 3.75 kHz symbols. In certain embodiments, the special subframe does not include an Uplink Pilot Time Slot (UpPTS).

In certain embodiments, the frame structure configuration may comprise an odd number of uplink subframes. The frame structure configuration may comprise a particular uplink subframe that is not part of an integer contiguous grouping of uplink subframes having a slot duration that is a multiple of 2 ms, the particular uplink subframe having a slot duration of 1 ms, wherein each slot includes three 3.75 kHz symbols. In certain embodiments, the method may comprise truncating uplink transmission using the particular uplink subframe.

In certain embodiments, the plurality of subframes may comprise at least three downlink subframes via which the wireless device can receive one or more reference signals and a control channel. In some cases, the one or more reference signals may comprise a Narrowband Primary Synchronization Signal and a Narrowband Secondary Synchronization Signal. The control channel may comprise a Narrowband Physical Broadcast Channel. In some cases, the frame structure configuration may be determined from a plurality of possible frame structure configurations, and the plurality of possible frame structure configurations from which the frame structure configuration is determined may be restricted to one or more legacy frame structure configurations comprising at least three downlink subframes via which the wireless device can receive the one or more reference signals and the control channel.

According to another example embodiment, a wireless device is disclosed. The wireless device comprises one or more processors. The one or more processors are configured to receive a frame structure configuration for a narrowband internet of things (NB-IoT) system operating in time division duplex (TDD) mode, the frame structure comprising a plurality of subframes, the plurality of subframes compris-ing at least one of each of a downlink subframe, an uplink subframe, and a special subframe comprising a gap period during which no transmission occurs, wherein the plurality of subframes are arranged such that the frame structure configuration is compatible with an uplink configuration of the NB-IOT system, e.g. having a subcarrier spacing of 3.75 kHz. The one or more processors are configured to perform receive or transmit operations according to the received frame structure configuration.

Certain embodiments of the present disclosure may provide one or more technical advantages. For example, certain embodiments may advantageously enable the operation of NB-IoT in TDD mode. As another example, certain embodiments may advantageously enable more efficient use of resources. As still another example, certain embodiments may advantageously enable high UL data rates. As yet another example, certain embodiments may advantageously allow for more possible frame structure configurations. As still another example, certain embodiments may advantageously enable all legacy configurations to be adapted for NB-IoT in TDD mode. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, NB-IoT has only been standardized for operation in FDD mode. The FDD design, however, cannot be directly applied to TDD modes. The NB-IoT uplink has adopted different numerologies in terms of subcarrier spacing and symbol size that impose constraints on the frame and subframe configurations. The present disclosure contemplates various embodiments that may advantageously enable operation of NB-IoT in TDD systems.

In certain embodiments, enabling operation of NB-IoT in TDD modes is achieved by determining TDD configurations that can be used for NB-IoT, thereby adapting NB-IoT for TDD operation. For example, in certain embodiments the UL/DL subframe configurations for LTE TDD are adapted to the UL numerology of NB-IoT. As another example, in certain embodiments the special subframe configurations for LTE TDD are adapted to the UL numerology of NB-IoT. As another example, in certain embodiments the number of UL symbols with new numerology is determined, such that they fit into the existing TDD LTE slots. As still another example, in certain embodiments the LTE TDD configurations are adapted to the structure of certain reference signals, such as NPSS and NSSS, or common control channel such as NPBCH.

Figure 1:
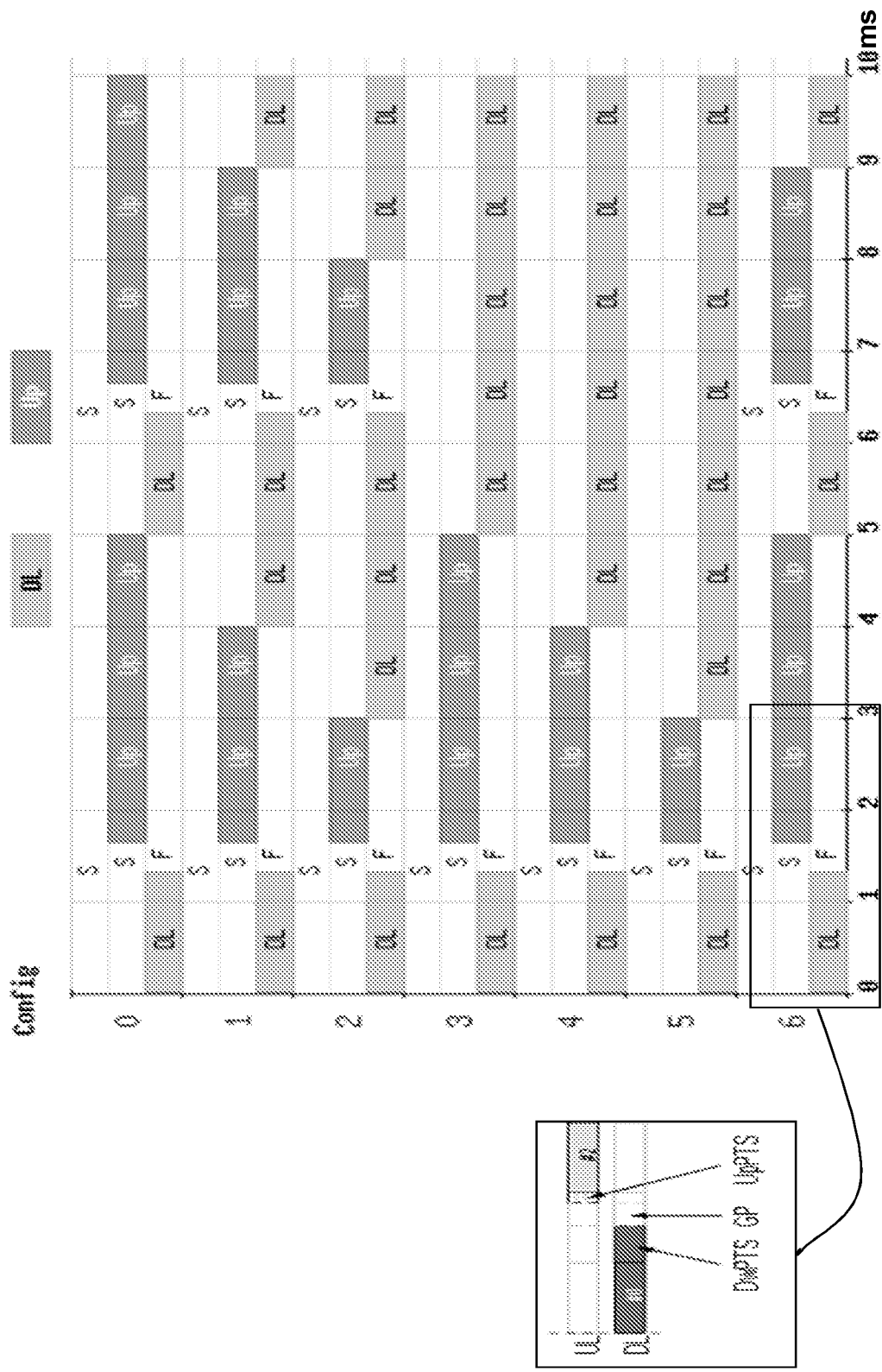
FIG. 1 illustrates the seven different DL/UL configurations that are defined for LTE-TDD systems.
Figure 2:
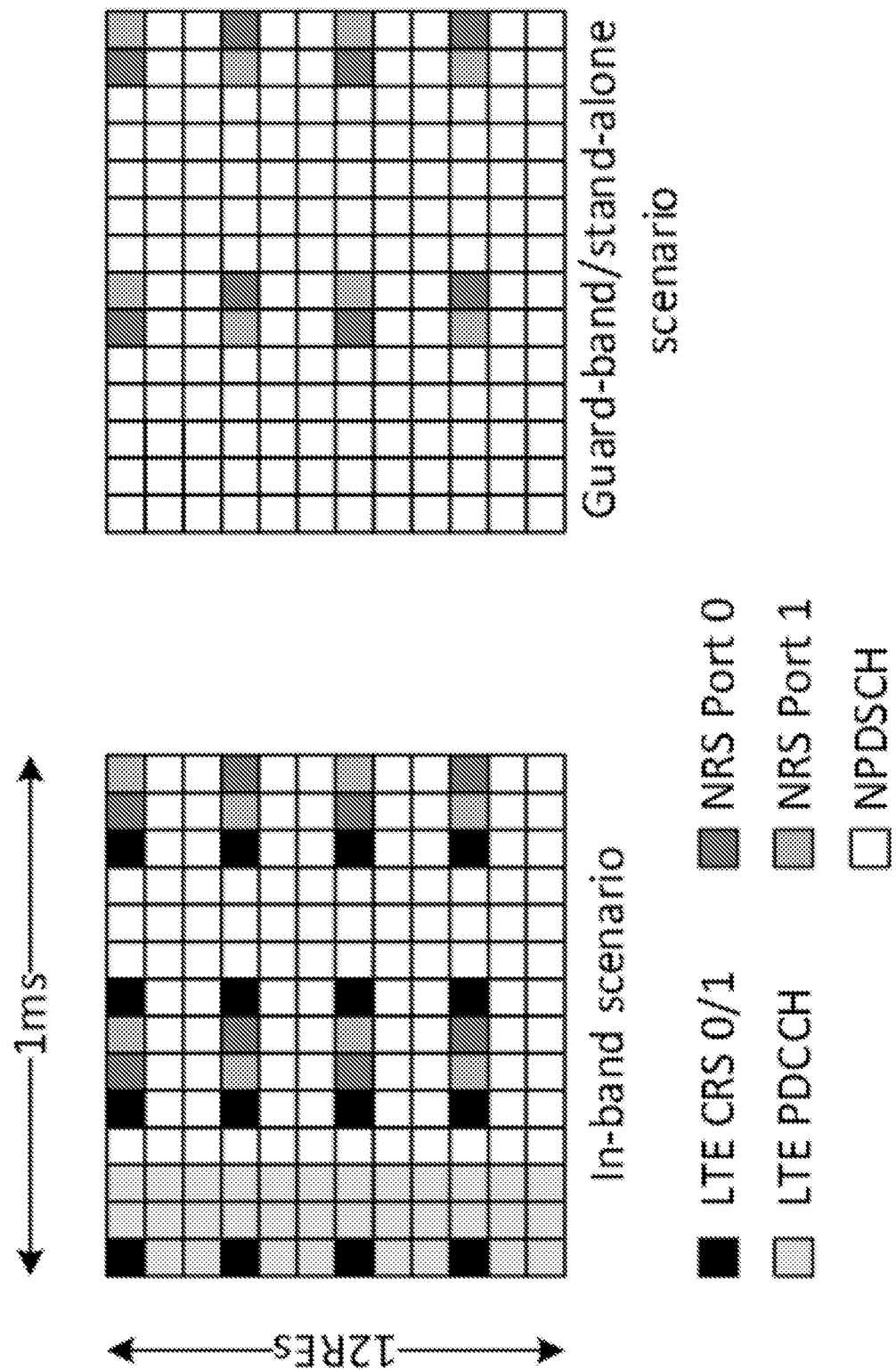
FIG. 2 shows the NRS reference symbols for different operation modes.
Figure 3:
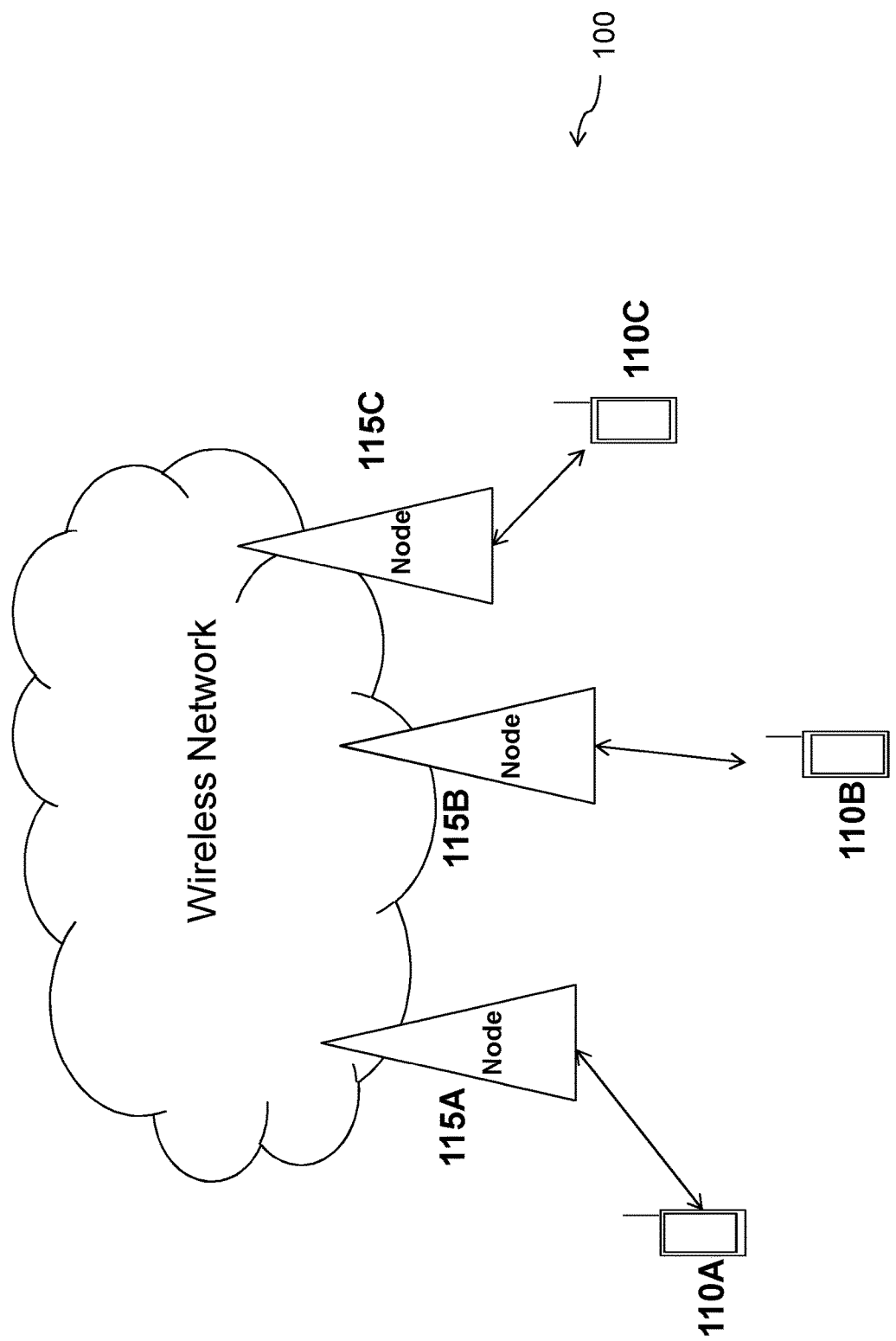
FIG. 3 is a block diagram illustrating an embodiment of a network, in accordance with certain embodiments.

FIG. 3 is a block diagram illustrating an embodiment of a network 100, in accordance with certain embodiments. Network 100 includes one or more UE(s) 110, which may be interchangeably referred to as wireless devices 110, and one or more network nodes 115, which may be interchangeably referred to as eNBs 115. UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. UEs 110 and network nodes 115 may be capable of operating using TDD, FDD, or any other suitable mode of operation. In some embodiments, an area of wireless signal coverage associated with a network node 115 may be referred to as a cell. In some embodiments, UEs 110 may have D2D capability. Thus, UEs 110 may be able to receive signals from and/or transmit signals directly to another UE. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be performed by network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum (NAS) layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more UEs 110, and one or more different types of network nodes capable of communicating (directly or indirectly) with UEs 110.

In some embodiments, the non-limiting term UE is used. UEs 110 described herein can be any type of wireless device capable of communicating with network nodes 115 or another UE over radio signals. UE 110 may be a radio communication device, target device, D2D UE, machine-type-communication (MTC) UE or UE capable of machine-to-machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, translation node (e.g., PLAT) or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 15-19.

Although FIG. 3 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

Although certain embodiments may be described in terms of NB-IoT systems having UL configurations with certain characteristics (e.g., 3.75 kHz subcarrier spacing and 2 ms slot duration), the various embodiments are not limited to these examples. Rather, the present disclosure contemplates that the various embodiments described herein may be applied to any suitable system, including systems that have UL configurations with other characteristics, such as, for example, different subcarrier spacing and/or slot duration.

2.1 NB-IoT Frame/Subframe Based on Legacy LTE Configuration

As described above, in NB-IoT UL transmission, both multi-tone and single-tone modulations are specified. While multi-tone is based on 15 kHz subcarrier spacing, similar to previous LTE releases, for single-tone, in addition to 15 kHz subcarrier spacing, operation with 3.75 kHz subcarrier spacing is also defined. In this case, the symbol duration of the 3.75 kHz carrier is four times larger than 15 kHz SC-FDMA in LTE. As a consequence, the NB-IoT slot duration is 2 ms for 3.75 kHz, i.e., four times that of LTE.

Furthermore, for multi-tone 15 kHz subcarrier spacing, besides 12 subcarriers within 180 kHz bandwidth, it is agreed that operating modes with 6 and 3 subcarriers are also included. All these numerologies result in different scheduling resources for UL, as shown below:

1. Multi-tone 15 kHz, 12 subcarriers: X{12}=1 ms
2. Multi-tone 15 kHz, 12 subcarriers: X{6}=2 ms
3. Multi-tone 15 kHz, 12 subcarriers: X{3}=4 ms
4. Single-tone, 15 kHz carrier frequency: X{1(15 kHz)}=8 ms
5. Single-tone, 3.75 kHz carrier frequency: X{1(3.75 kHz)}=32 ms Where X refers to the length of the resource block and is a function of the number inside. So X{12} means the length of the 15 kHz multi-tone transmission with 12 subcarrier is 1 ms. And so forth for other bullets.

In the figures, a Downlink subframe is referred to as D, an Uplink subframe is referred to as U and a special subframe id referred to as S.

Figure 4:
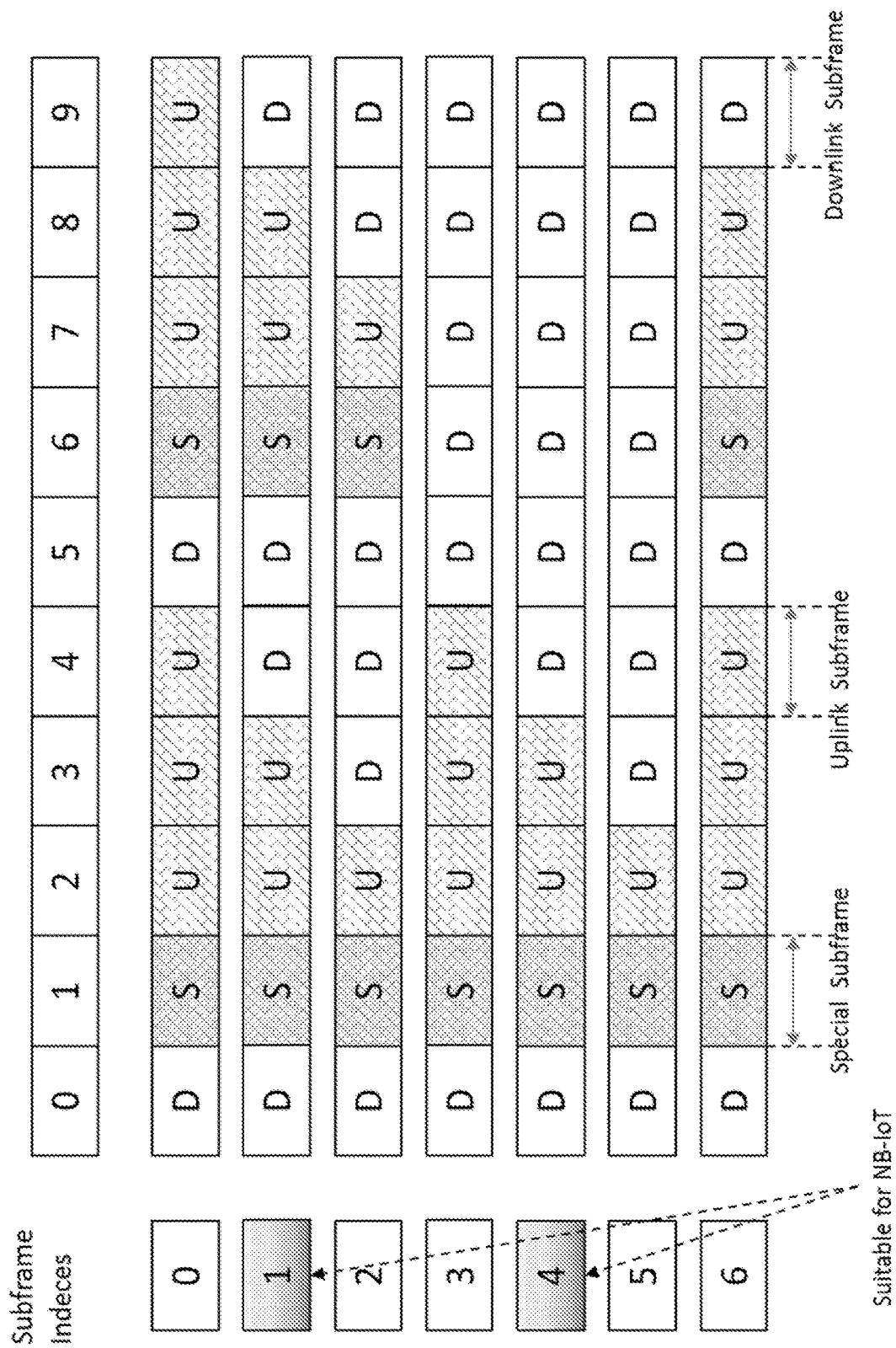
FIG. 4 illustrates LTE SC-FDMA multi-tone TDD frame structures, in accordance with certain embodiments.

FIG. 4 illustrates LTE SC-FDMA multi-tone TDD frame structures, in accordance with certain embodiments. More particularly, FIG. 4 illustrates the existing LTE frame structures for the TDD solution in case of 15 kHz SC-FDMA as defined in 3GPP TS 36.211, "Evolved Universal Terrestrial Radio Access (EUTRA); Physical channels and modulation" Release 13. As shown in FIG. 4, there are seven frame configurations 0-6. For each frame, there are uplink, downlink and special subframes. Within the special subframes, there is a gap where switching from UL to DL takes place. These configurations were designed based on the LTE 1 ms subframe and 0.5 slot length, the latter is the smallest possible scheduling unit in LTE. As described above, however, in the case of NB-IoT there are other restrictions caused by the different UL numerologies.

With respect to the 15 kHz subcarrier spacing in UL, the subframe and slot duration could simply be adopted by NB-IoT TDD since the symbol duration would be the same as legacy LTE, although the scheduling resource units need to be modified in some cases. With respect to the single-tone 3.75 kHz carrier spacing, however, if it is assumed that the current FDD slot duration will be adopted for TDD, the main constraint is the 2 ms slot duration imposed on the frame structure. Thus, the only legacy TDD frame configurations that could be used for NB-IoT are the ones that have integer contiguous uplink subframes such that their duration is a multiple of 2 ms.

According to one example embodiment, the UL/DL subframe configurations for TDD are adapted to the UL numerology of NB-IoT. For example, for in-band and guard-band NB-IoT with 3.75 kHz subcarrier spacing, the number of UL subframes needs to be adapted such that an integer number of 3.75 kHz symbols can fit into the continuous UL region. As described above, the only legacy TDD frame configurations that could be used for NB-IoT are the ones that have integer contiguous uplink subframes such that their duration is a multiple of 2 ms. As can be seen from FIG. 4, only frame structures 1 and 4 meet this condition and are suitable for NB-IoT. Thus, in certain embodiments the available subframe configurations are restricted to existing TDD configurations 1 and 4 in order to accommodate NB-IoT UL with 3.75 kHz subcarrier spacing and 2 ms slot length.

However, using only these two schemes, i.e., legacy TDD configurations 1 and 4, restricts the transmission rates between UL and DL to only two choices. Furthermore, these two schemes only allow high data rates for DL; neither provides high data rate for UL. In order to overcome the problem, in certain embodiments other configurations are introduced in which it could be possible to have higher data rates for UL. Examples of these new frame configurations are shown in FIGS. 5 and 6.

Figure 5:
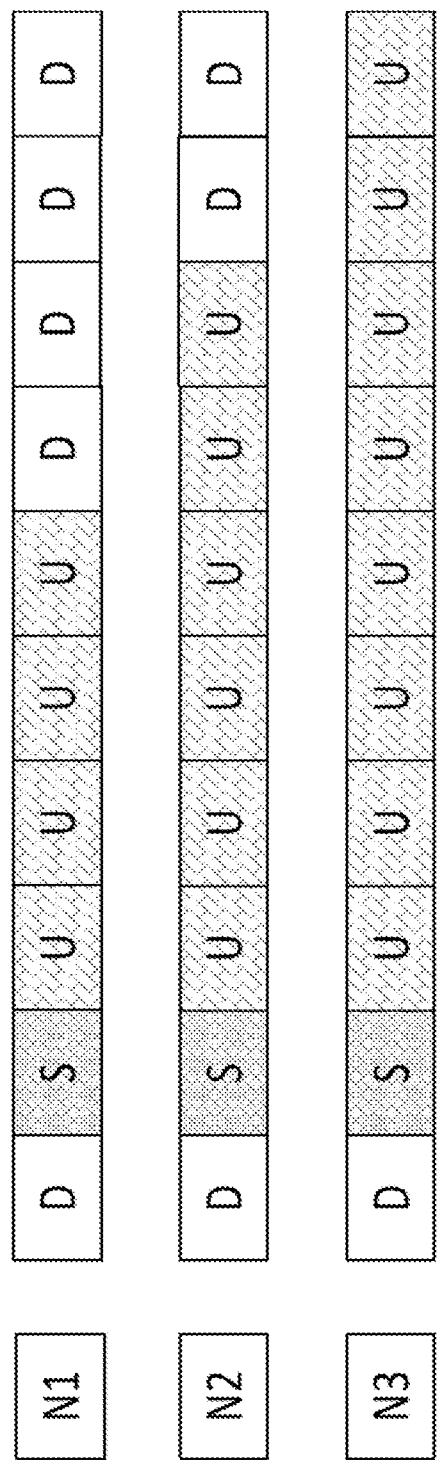
FIG. 5 illustrates possible frame configurations for 2 ms uplink slot length, keeping the special subframe at the same position, in accordance with certain embodiments.

FIG. 5 illustrates possible frame configurations for 2 ms uplink slot length, keeping the special subframe at the same position, in accordance with certain embodiments. More particularly, FIG. 5 shows a few possible frame configurations where the special subframe positions are kept similar to legacy configurations, but the frame structures provide more subframes for UL. In addition, the number of UL subframes in the example new frame configurations of FIG. 5 are kept multiple of 3.75 kHz carrier slot lengths. Moreover, in the example frame configurations of FIG. 5, the number of special subframes has been reduced to one, which may advantageously enable more efficient use of resources. N1, N2 and N3 just refer to naming tags New configuration 1, New configuration 2, and New configuration 3.

In certain embodiments, other new TDD frame configurations are introduced. These new TDD configurations have a minimum continuous UL duration such that they support NB-IoT with 3.75 kHz numerology. Moreover, the provided subframe and frame configurations may be used for the standalone deployments as well.

Figure 6:
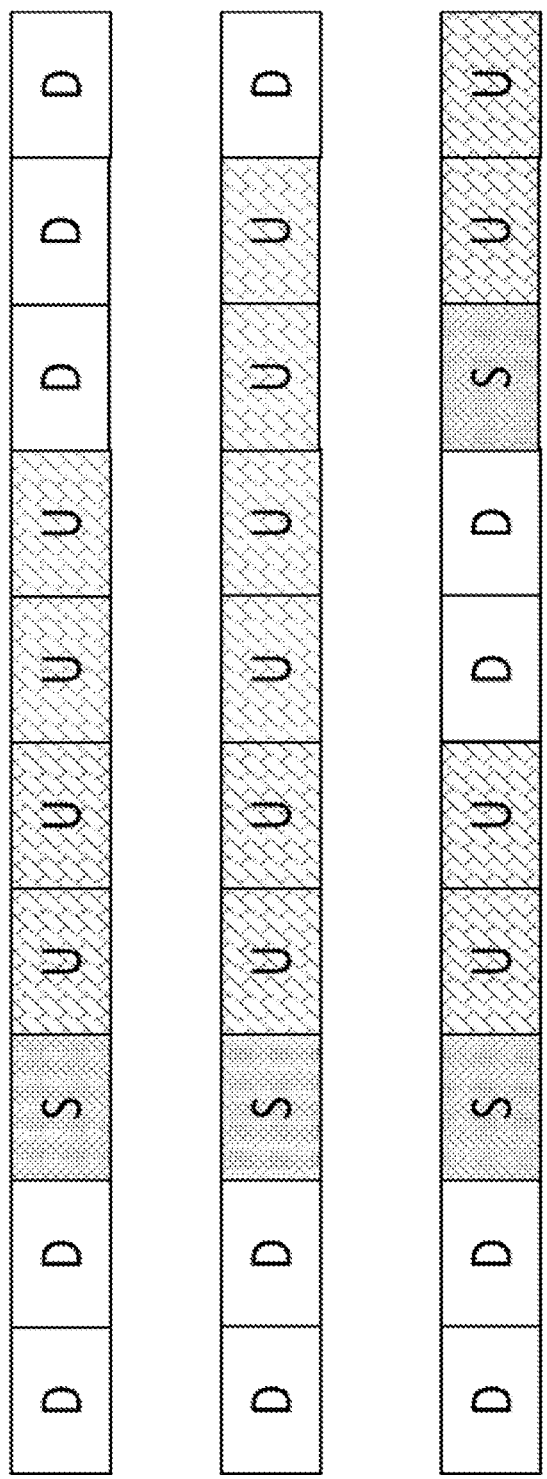
FIG. 6 illustrates possible frame configurations with a shift in the special subframe position, in accordance with certain embodiments.

FIG. 6 illustrates possible frame configurations with a shift in the special subframe position e.g. from the second subframe to the third subframe in accordance with certain embodiments. i.e., instead of setting second subframe as a special subframe, the third subframe is the special subframe. One specific adaptation of the TDD configurations may be attained by shifting the position of special subframes by one within one frame. For example, in each of the frame configurations illustrated in FIG. 6, the special subframe is the third subframe of the frame, in contrast to the frame configurations shown in FIGS. 4 and 5. Shifting the position of the special subframes by one within the frame may advantageously allow for more frame structure possibilities.

Although the various embodiments have been described in terms of the 3.75 kHz subcarrier frequency, the proposed configurations are applicable for 15 kHz as well. This is because the duration of all different subframes of type 15 kHz multi-tone and single-tone schemes are based on 1 ms slot length. This is beneficial when the system needs to support both types of UEs with different subcarrier frequencies.

2.2 Special Subframe Configurations for NB-IoT

According to another example embodiment, the special subframe configurations for TDD are adapted to the UL numerology of NB-IoT. Based on the configurations described above in section 2.1, there are always one or two special subframes in one frame. The special subframes are used for switching the transmission from DL to UL. To avoid DL to UL interference, the special subframe includes a gap during which no transmission occurs. The gap is adjusted so that the round trip delay from the UE and other switching delays due to hardware effects can be compensated, and so the transmission signals arrive synchronized in the eNB without interference from the DL transmission.

TABLE 1 below shows the possible special subframe configurations in current LTE specifications, as defined in 3GPP TS 36.211, "Evolved Universal Terrestrial Radio Access (EUTRA); Physical channels and modulation" Release 13.

TABLE 1

| Special subframe configuration | DwPTS (OFDM symbols) OFDM Symbol | ms | GP OFDM Symbol | ms | UpPTS OFDM Symbol | ms |
|---|---|---|---|---|---|---|
| 0 | 3 | 0.2146 | 10 | | 1 + X | 0.0714 − (x * 2192 * Ts) |
| 1 | 9 | 0.6432 | 4 | | | |
| 2 | 10 | 0.7146 | 3 | | | |
| 3 | 11 | 0.7859 | 2 | | | |
| 4 | 12 | 0.8573 | 1 | | | |
| 5 | 3 | 0.2113 | 9 | | 2 + X | 0.1427 − (x * 2192 * Ts) |
| 6 | 9 | 0.6432 | 3 | | | |
| 7 | 10 | 0.7146 | 2 | | | |
| 8 | 11 | 0.7859 | 1 | | | |
| 9 | 6 | 0.4286 | 6 | | | |

As described above, the symbol duration of single tone 3.75 kHz subcarrier spacing is four times that of the 15 kHz symbol length. In the case of legacy LTE, the special subframe configuration may have only one or two 15 kHz symbols for the UL Pilot Time Slot (UpPTS), and therefore cannot be used for NB-IoT. One potential approach is not to use these symbols for any transmission. This approach, of course, would not be efficient.

In order to use the available resources efficiently, certain embodiments introduce new special subframe formats. In addition, certain embodiments propose special subframes in which the length of UpPTS is an integer multiple of 3.75 kHz symbol durations, or equivalently, four 15 kHz SC-FDMA symbols duration.

Figure 7:
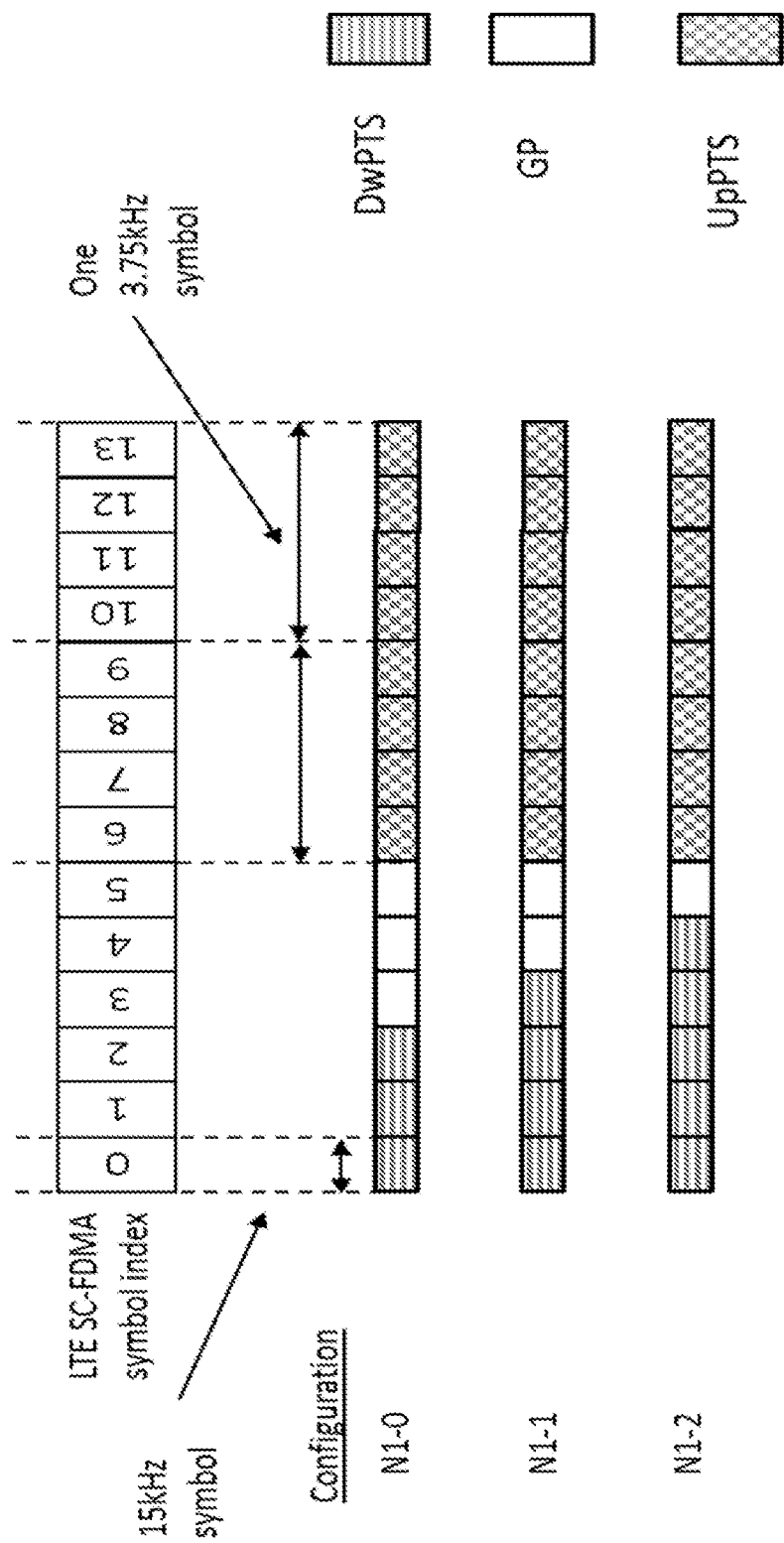
FIG. 7 illustrates exemplary special subframes for TDD NB-IoT with two 3.75 kHz symbols in the subframe, in accordance with certain embodiments.
Figure 8:
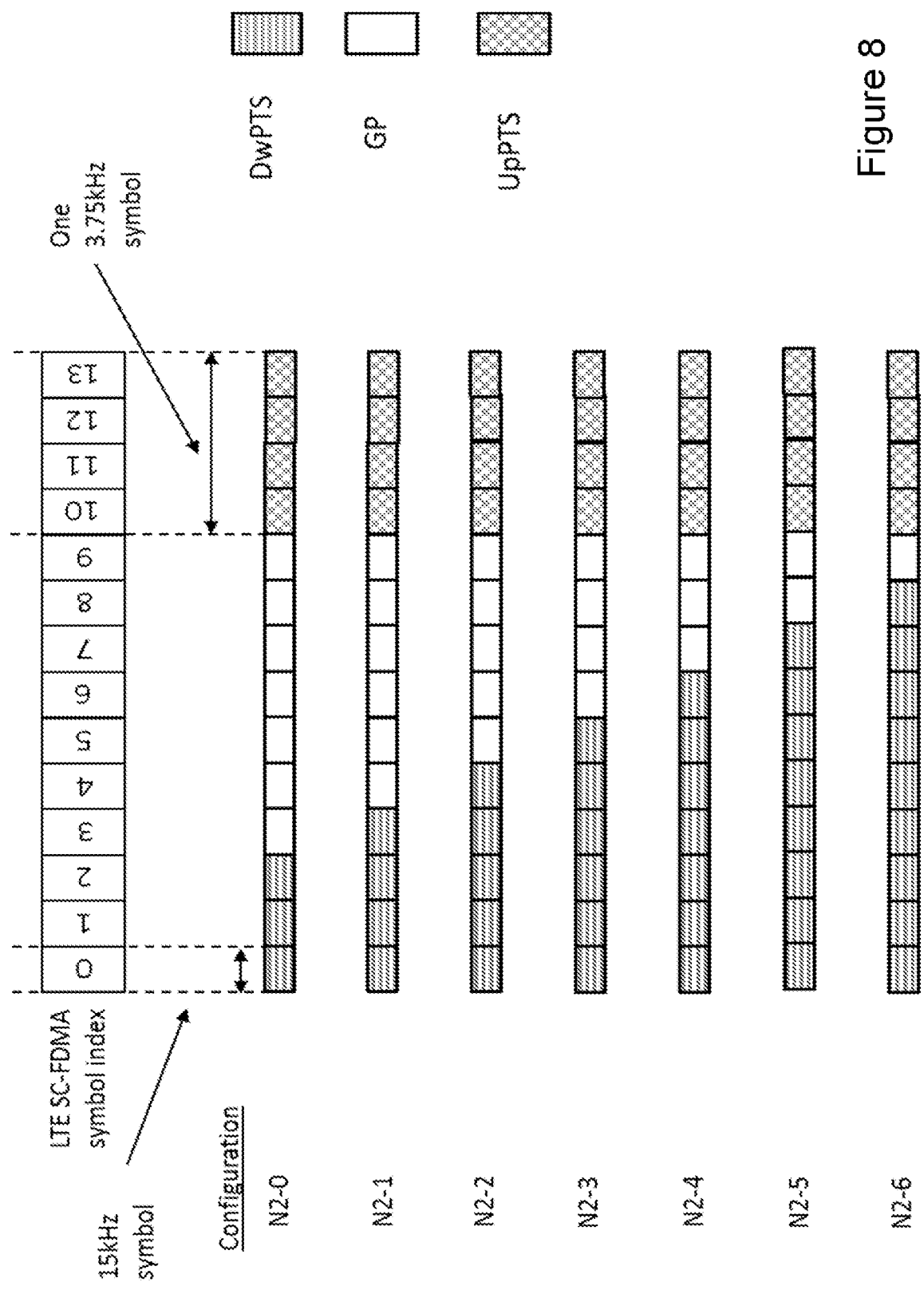
FIG. 8 illustrates exemplary special subframes for TDD NB-IoT with one 3.75 kHz symbol in the subframe, in accordance with certain embodiments.
Figure 9:
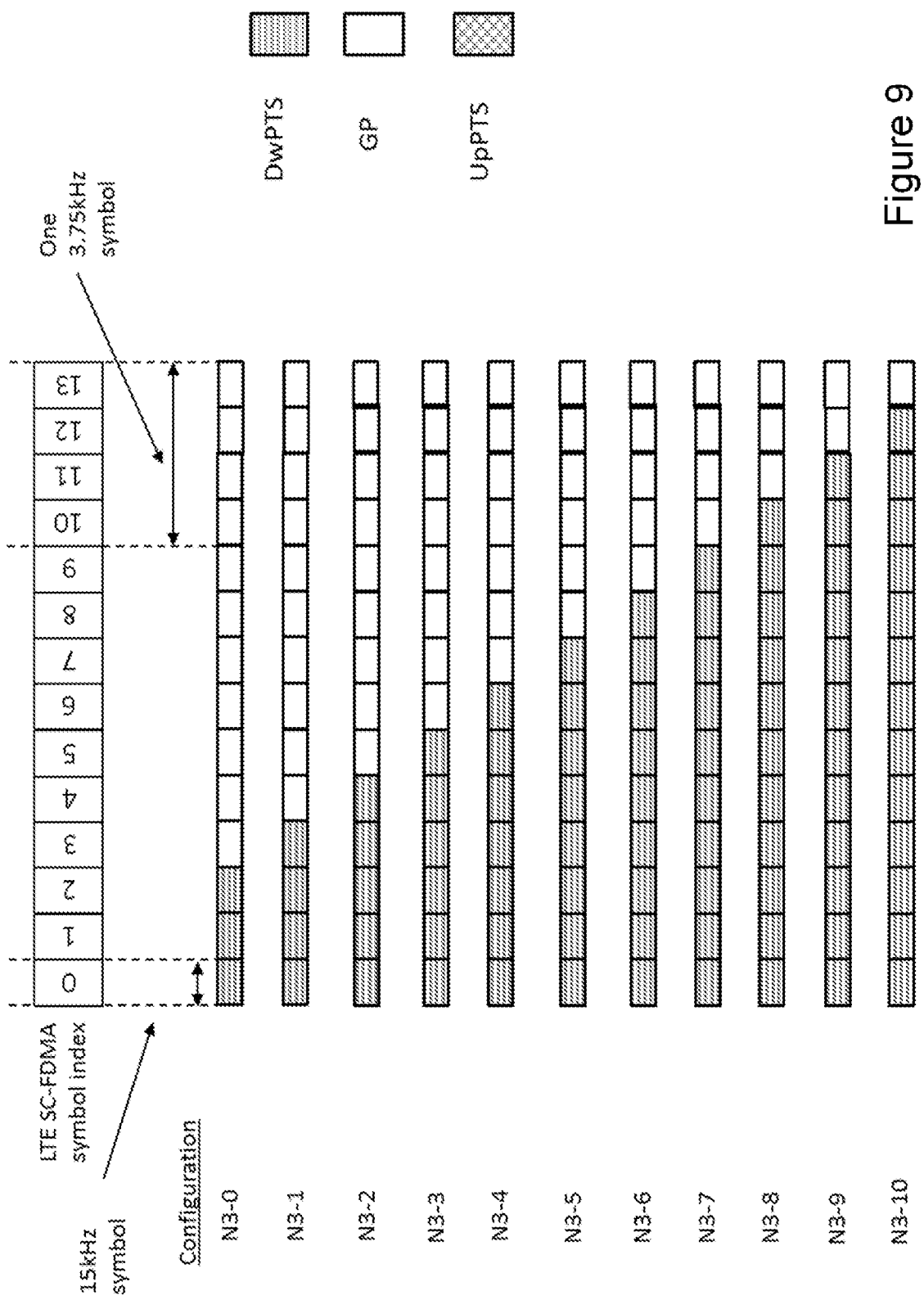
FIG. 9 illustrates exemplary special subframes for TDD NB-IoT including no 3.75 kHz symbols in the subframe, in accordance with certain embodiments.

Within one LTE subframe there are 14 SC-FDMA symbols with 15 kHz subcarrier spacing. The first three symbols in the in-band/guard-band cases are reserved for PDCCH transmission. Thus, in certain embodiments up to two 3.75 kHz symbols may be assigned in each special subframe. Examples of new special subframes for TDD NB-IoT are illustrated in FIGS. 7-9. In these embodiments it may be grouped 4 (15 kHz based) legacy symbols to construct a (3.75 kHz) based symbol in uplink.

FIG. 7 illustrates exemplary special subframes for TDD NB-IoT with two 3.75 kHz symbols in the subframe, in accordance with certain embodiments. In FIG. 7, eight SC-FDMA symbols are assigned to UL (UpPTS) so that two 3.75 kHz symbols can be transmitted during these times after the gap (GP).

FIG. 8 illustrates exemplary special subframes for TDD NB-IoT with one 3.75 kHz symbols in the subframe, in accordance with certain embodiments. In FIG. 8, the same idea is applied except that four SC-FDMA symbols are reserved for UL (UpPTS), which carries one 3.75 kHz single carrier symbol. Thus, one 3.75 kHz symbol can be transmitted during this time after the gap (GP).

FIG. 9 illustrates exemplary special subframes for TDD NB-IoT including no 3.75 kHz symbols in the subframe, in accordance with certain embodiments. In FIG. 9, the provided special subframes only contain DL (DwPTS) and the gap (GP). There is no UL (UpPTS) subframe assigned.

Figure 10:
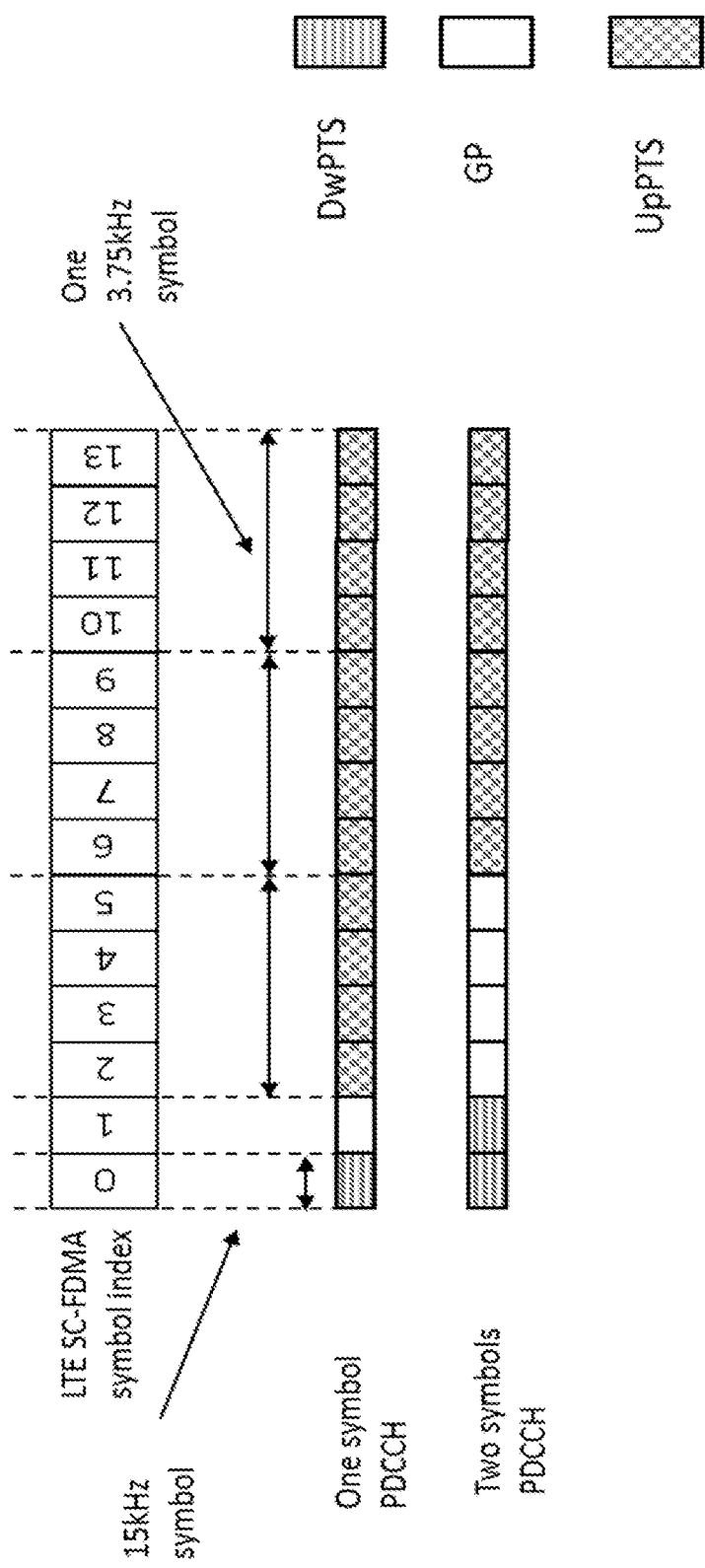
FIG. 10 illustrates exemplary special subframes for TDD NB-IoT when PDCCH occupies only one or two OFDM symbols, in accordance with certain embodiments.

FIG. 10 illustrates exemplary special subframes for TDD NB-IoT when PDCCH occupies only one or two OFDM symbols, in accordance with certain embodiments. In the special subframes, PDCCH may occupy as many as the first three symbols after the gap (GP). In some cases, however, PDCCH occupies only one or two OFDM symbols in the DL direction. In certain embodiments, up to three 3.75 kHz symbols are assigned to UpPTS within the special subframe, for example, when PDCCH occupies only one OFDM symbol in the special subframe (GP). In certain embodiments, a larger gap (GP) is included instead as shown in the example of lower part of FIG. 10 in which PDCCH occupies two OFDM symbols in the special subframe. In the lower figure, the number of PDCCH symbols are two but number of GPs are four. It should be noted that each frame configuration comprises a DL subframe, an UL subframe and special subframes and each Special subframe comprises DwPTS, GP and UpPTS.

In certain embodiments, the special subframe configurations are restricted to only those configurations that allow at least one NB-IoT symbol with new numerology in the UL part of the special subframe.

2.3 Adapting Slot Duration to the UL Subcarrier Numerology

According to another example embodiment, the number of UL symbols with new numerology is determined such that they fit into the existing TDD LTE slots. In certain embodiments, the number of symbols with 3.75 kHz carrier frequency may be determined to be lower in order to fit into a slot that is designed for 15 kHz subcarrier spacing.

In the example embodiments described above with respect to sections 2.1 and 2.2, it was assumed that the 2 ms slot length for 3.75 kHz subcarrier spacing in case of FDD is also adopted for TDD. If that is the case, however, this will make some of the legacy frame configurations obsolete. Certain embodiments described herein resolve this by defining a one millisecond duration based 3.75 kHz slot, where in one slot three 3.75 kHz symbols are placed. Furthermore, in case there are odd numbers of subframes within the UL transmission period in one frame, 2 ms slot based transmission is truncated accordingly above 1 ms slot. Such an embodiment may have certain advantages. For example, such an embodiment may advantageously enable NB-IoT to be deployed efficiently in existing TDD LTE networks. In addition, such an embodiment may advantageously enable all legacy TDD configurations are adopted for NB-IoT transmission.

Figure 11:
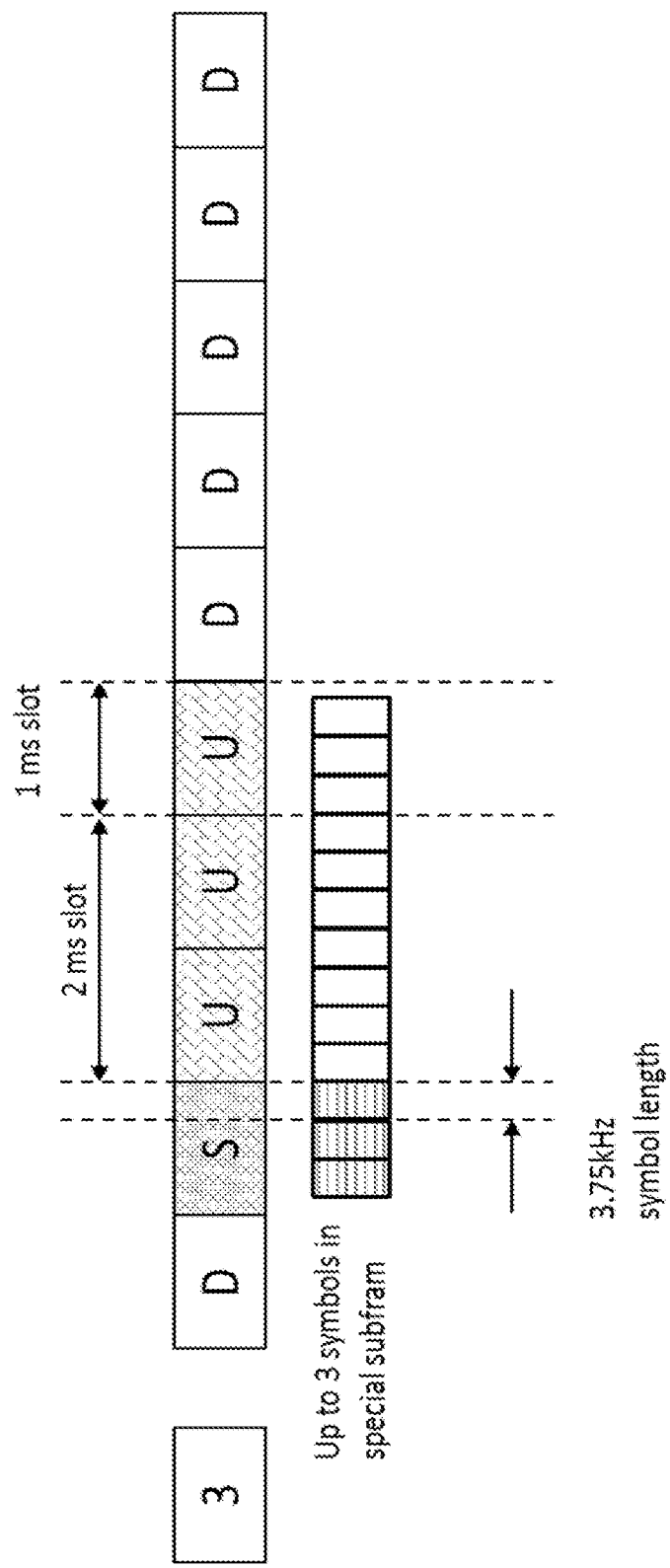
FIG. 11 illustrates the use of 1 ms based slots for 3.75 kHz subcarrier spacing, in accordance with certain embodiments.

FIG. 11 illustrates the use of 1 ms based slots for 3.75 kHz subcarrier spacing, in accordance with certain embodiments. More particularly, FIG. 11 illustrates a 1 ms slot duration besides 2 ms slot durations for legacy frame configuration number 3.

2.4 Method of Adapting TDD Configuration to the NB-IoT Downlink Reference Signals and/or Common Control Channel According to another example embodiment, the TDD configurations are adapted to the structure of certain reference signals (such as NPSS and NSSS) or a common control channel (such as NPBCH). In certain embodiments, the adaptation may be in the form of restricting TDD configurations to only those that contain downlink reference signals and common channels.

At the beginning of the connection setup, a UE first camps on a cell by synchronizing its receiver to the timing and frequency of transmission signals of the cell and detecting the cell ID. This is achieved by tracking the NPSS and NSSS that are sent from the eNB in periodic intervals. Subsequently, to be able to start connection setup, the UE detects the most important information regarding the cell configuration (e.g., cell bandwidth, etc.) by detecting the NBPCH, which is also sent at periodic intervals.

Figure 12:
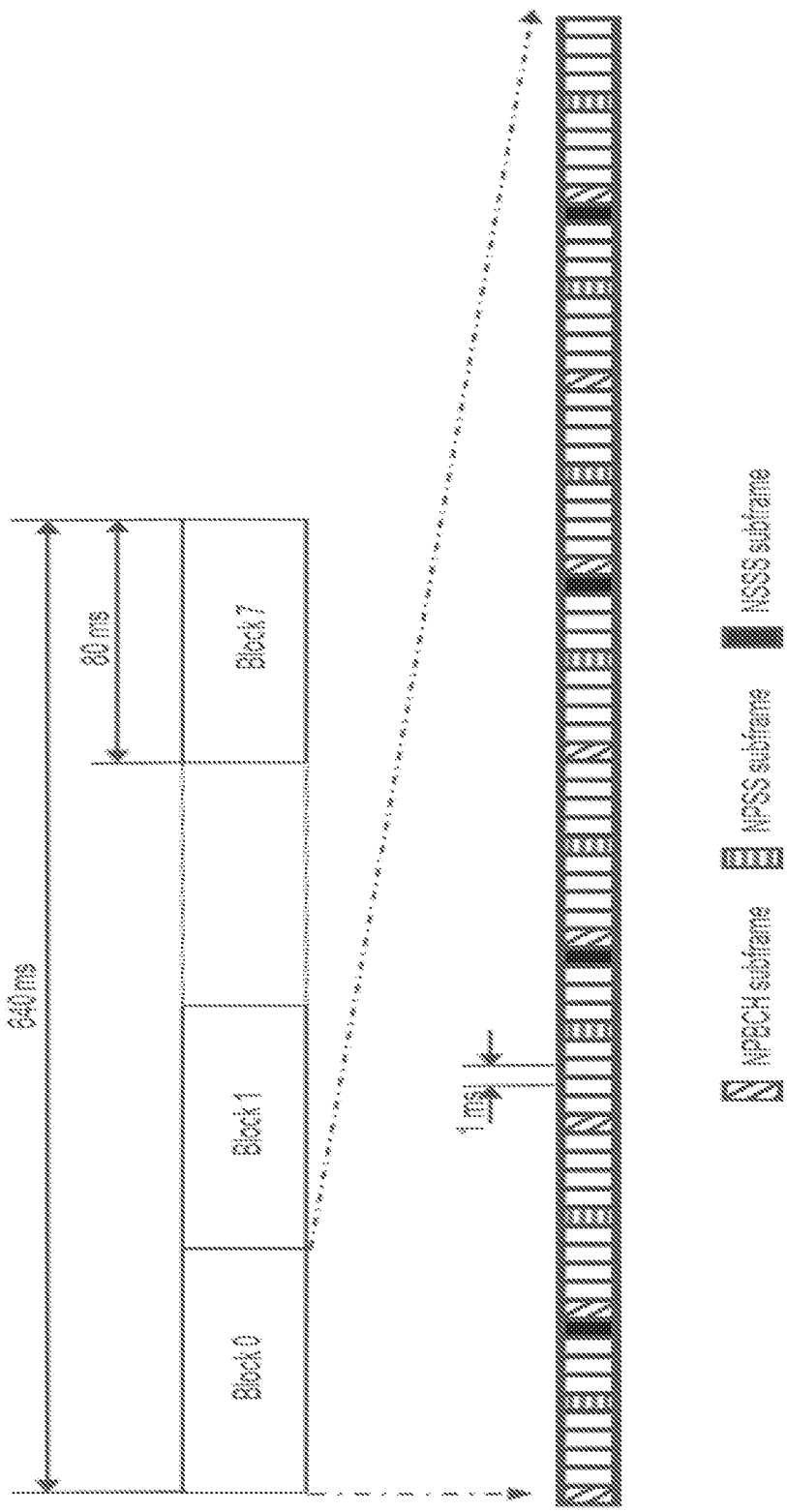
FIG. 12 illustrates the position and periodicity of the NPSS/NSSS signals and NPBCH channel, in accordance with certain embodiments.

FIG. 12 illustrates the position and periodicity of the NPSS/NSSS signals and PBCH channel, in accordance with certain embodiments. In other words, FIG. 12 shows how frequently NPSS, NSSS and NPBCH are transmitted by the FDD NB-IoT cell in Release 13. If the range and accuracy of time and frequency estimation and the bit error rate of master information block (MIB) information detection carried by NPBCH of TDD NB-IoT is to be kept at the same level of FDD NB-IoT, there is a need to adopt the same transmission periodicity and signal design as FDD.

As can be seen from FIG. 12, NPSS and NPBCH occupy two subframes every 10 ms. NSSS occupies one subframe every 20 milliseconds. Based on this, if the same periodicity and signal design as FDD is adopted for TDD, then in every 10 ms frame configuration there should exist at least two DL subframes to carry NPSS and NBPCH, and besides NPSS and NBPCH, at least NSSS and possibly other system information signals (e.g., Session Information Block (SIB) messages) along with NPDCCH are required to be transmitted so that unicast control and data information can be exchanged between eNB and UE.

In order to avoid the above described problems, in certain embodiments TDD frame configurations are restricted to those frame configurations that allow DL data as well as important DL reference signals and common broadcast signals to be transmitted. For example, considering the current synchronization and PBCH design for FDD, in certain embodiments frame configuration number 0 (depicted in FIG. 4 above) shall not be used for TDD NB-IoT. This is because frame configuration number 0 only consists of two DL subframes within every frame, when there is single PRB operation for NB-IoT. As another example, when using frame configuration number 6 (depicted in FIG. 4 above), the UE can only receive information (besides NSSS, NPSS and NBPCH) in one subframe every 20 milliseconds, which cannot support the uplink transmission and downlink control and data transmission at the same time in an efficient way. Therefore, in certain embodiments frame configuration number 6 shall not be used for TDD NB-IoT in single PRB operation mode.

Figure 13:
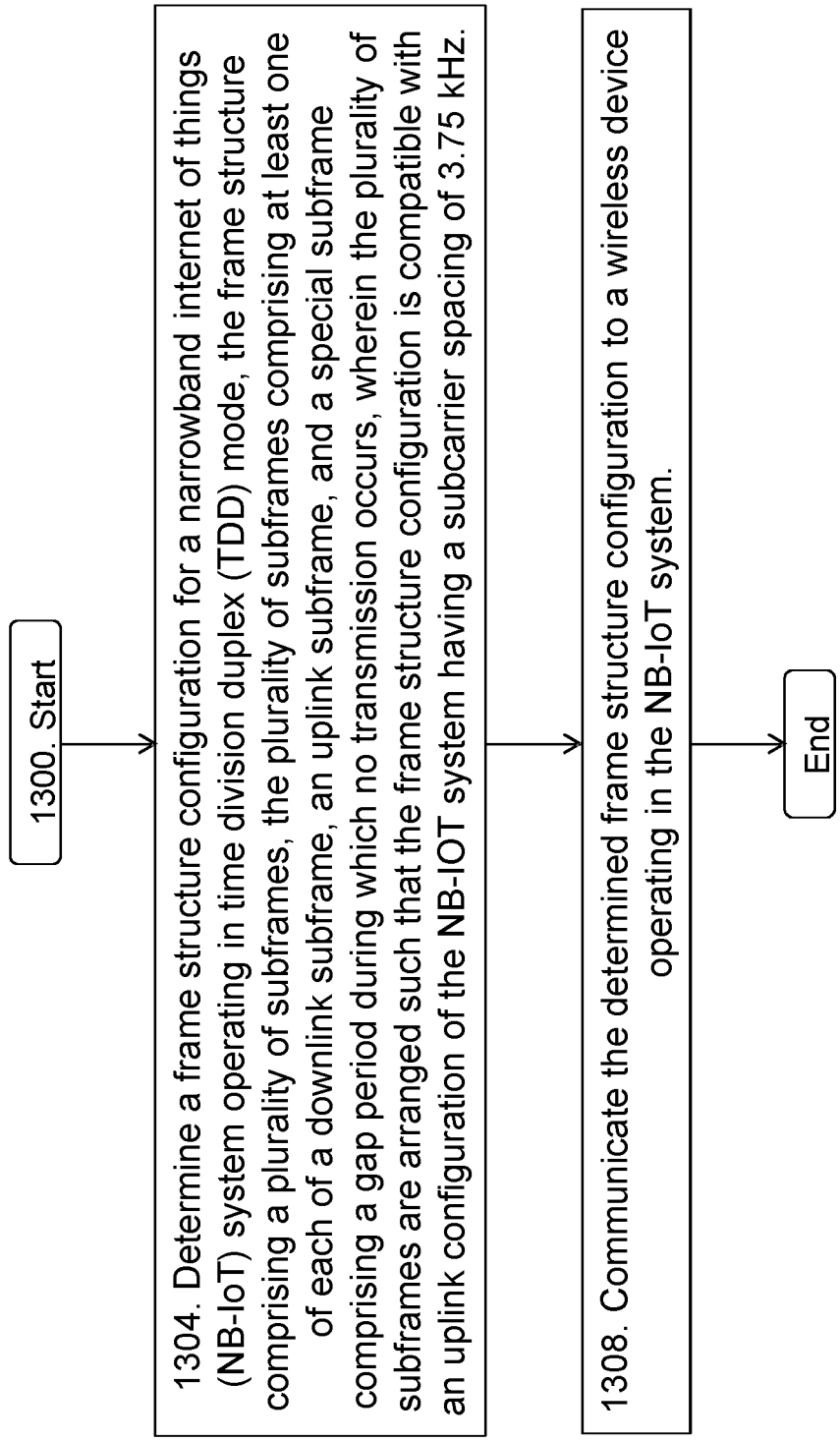
FIG. 13 is a flow diagram of a method in a network node, in accordance with certain embodiments.

FIG. 13 is a flow diagram of a method 1300 in a network node such as the network node, in accordance with certain embodiments.

Step 1304

The method begins at step 1304, where the network node 115 determines a frame structure configuration for a narrowband internet of things (NB-IoT) system operating in time division duplex (TDD) mode. The frame structure comprises a plurality of subframes. The plurality of subframes comprises at least one of each of a downlink subframe, an uplink subframe, and a special subframe. The special subframe comprises a gap period during which no transmission occurs, wherein the plurality of subframes are arranged such that the frame structure configuration is compatible with an uplink configuration of the NB-IoT system. The NB-IoT system may have a subcarrier spacing of 3.75 kHz. In certain embodiments, determining the frame structure configuration for the NB-IoT system may comprise adapting a legacy LTE frame structure to be compatible with the uplink configuration of the NB-IoT system. The determination may be performed at the very beginning of the transmission. This may first be set when a network parameter is configured. The frame configuration type may be sent to the wireless device 120 by the network such as the network node 115 e.g. in the System Information Block Type 1 (SIB1).

Step 1308

At step 1308, the network node 115 communicates the determined frame structure configuration to a wireless device such as the wireless device 110 operating in the NB-IoT system. The configuration may be sent to the wireless device 110 via SIB1.

The configuration may be used by the wireless device 110 to perform receive or transmit operations according to the received frame structure configuration.

In certain embodiments, the frame structure configuration may comprise integer contiguous uplink subframes having a slot duration that is a multiple of 2 ms. In some cases, the frame structure configuration may be determined from a plurality of possible frame structure configurations, and the method may comprise restricting the plurality of possible frame structure configurations from which the frame structure configuration is determined to one or more legacy frame structure configurations comprising integer contiguous uplink subframes having a slot duration that is a multiple of 2 ms. In some cases, the frame structure configuration may comprise a single special subframe. In some cases, any one out of a second subframe and a third subframe of the frame structure configuration may be the special subframe.

In certain embodiments, the special subframe may comprise a Downlink Pilot Time Slot (DwPTS) and an Uplink Pilot Time Slot (UpPTS), and the UpPTS may have a duration that is an integer multiple of a 3.75 kHz symbol duration, the 3.75 kHz symbol duration equal to a duration of four 15 kHz Single Carrier Frequency Division Multiple Access (SC-FDMA) symbols. In some cases, the UpPTS may have a duration of one 3.75 kHz symbol. In some cases, the UpPTS has a duration of two 3.75 kHz symbols. In some cases, the UpPTS may have a duration of three 3.75 kHz symbols. In certain embodiments, the special subframe may not include an Uplink Pilot Time Slot (UpPTS).

In certain embodiments, the frame structure configuration may comprise an odd number of uplink subframes, and may comprise a particular uplink subframe that is not part of an integer contiguous grouping of uplink subframes having a slot duration that is a multiple of 2 ms. The particular uplink subframe may have a slot duration of 1 ms, wherein each slot includes three 3.75 kHz symbols. In certain embodiments, the method may comprise configuring the wireless device to truncate uplink transmission using the particular uplink subframe.

In certain embodiments, the plurality of subframes may comprise at least three downlink subframes via which the wireless device can receive one or more reference signals and a control channel. In some cases, the one or more reference signals may comprise a Narrowband Primary Synchronization Signal and a Narrowband Secondary Synchronization Signal, and the control channel may comprise a Narrowband Physical Broadcast Channel. In some cases, the frame structure configuration may be determined from a plurality of possible frame structure configurations, and the method may comprise restricting the plurality of possible frame structure configurations from which the frame structure configuration is determined to one or more legacy frame structure configurations comprising at least three downlink subframes via which the wireless device can receive the one or more reference signals and the control channel.

Figure 14:
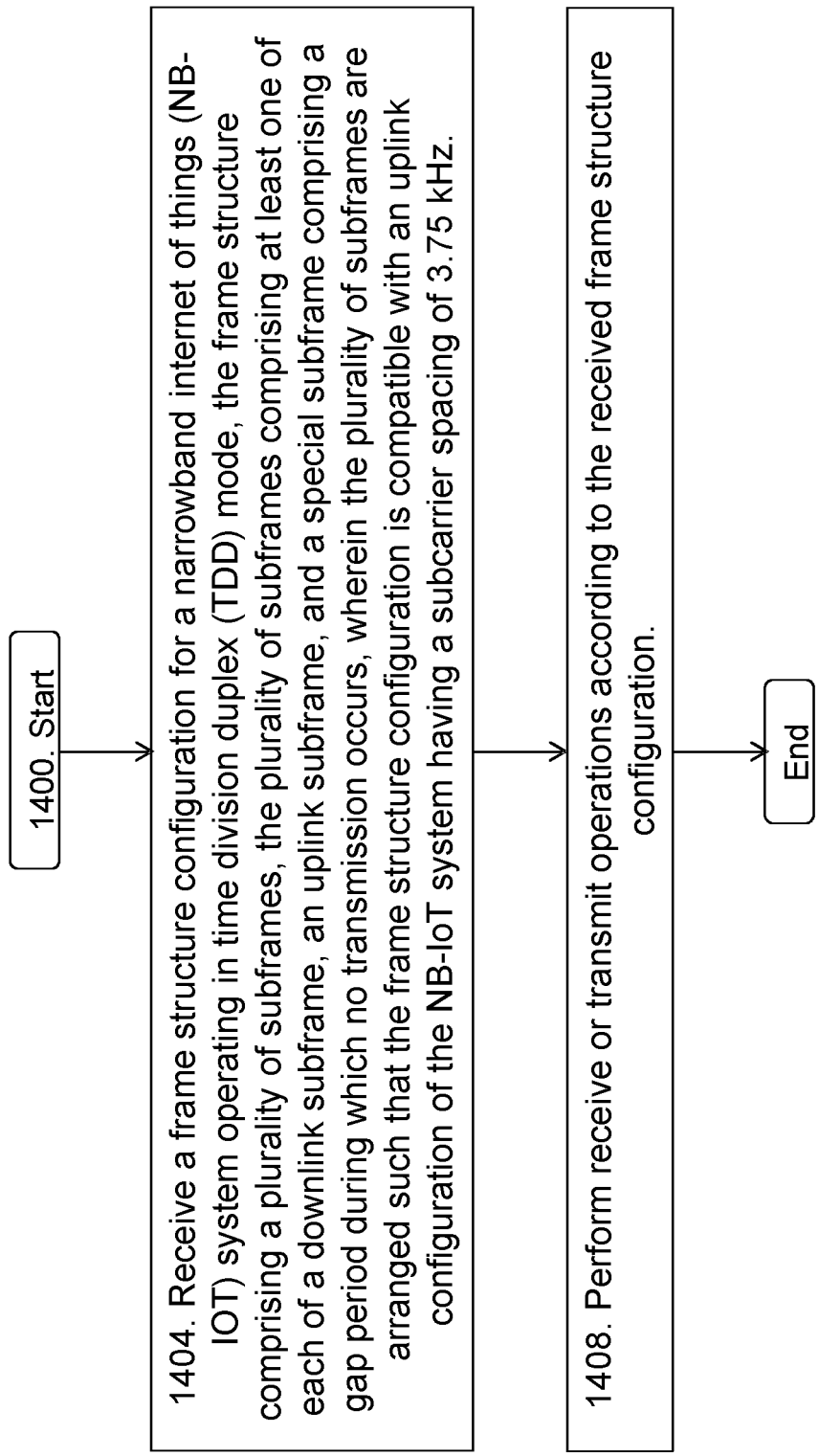
FIG. 14 is a flow diagram of a method in a wireless device, in accordance with certain embodiments.

FIG. 14 is a flow diagram of a method 1400 in a wireless device such as the wireless device 110, in accordance with certain embodiments.

Step 1404

The method begins at step 1404, where the wireless device 110 receives a frame structure configuration for a narrowband internet of things (NB-IoT) system operating in time division duplex (TDD) mode. The frame structure comprises a plurality of subframes. The plurality of subframes comprises at least one of each of a downlink subframe, an uplink subframe, and a special subframe. The special subframe comprises a gap period during which no transmission occurs, wherein the plurality of subframes is arranged such that the frame structure configuration is compatible with an uplink configuration of the NB-IoT system. The NB-IoT system may have a subcarrier spacing of 3.75 kHz.

Step 1408

At step 1408, the wireless device 110 performs receive or transmit operations according to the received frame structure configuration.

In certain embodiments, the frame structure configuration may comprise integer contiguous uplink subframes having a slot duration that is a multiple of 2 ms. In some cases, the frame structure configuration may be determined from a plurality of possible frame structure configurations, and the plurality of possible frame structure configurations from which the frame structure configuration is determined may be restricted to one or more legacy frame structure configurations comprising integer contiguous uplink subframes having a slot duration that is a multiple of 2 ms. In some cases, the frame structure configuration may comprise a single special subframe. In some cases, any one out of a second subframe and a third subframe of the frame structure configuration may be the special subframe.

In certain embodiments, the special subframe may comprise a Downlink Pilot Time Slot (DwPTS) and an Uplink Pilot Time Slot (UpPTS). The UpPTS may have a duration that is an integer multiple of a 3.75 kHz symbol duration, the 3.75 kHz symbol duration equal to a duration of four 15 kHz Single Carrier Frequency Division Multiple Access (SC-FDMA) symbols. In some cases, the UpPTS may have a duration of one 3.75 kHz symbol. In some cases, the UpPTS may have a duration of two 3.75 kHz symbols. In some cases, the UpPTS may have a duration of three 3.75 kHz symbols. In certain embodiments, the special subframe does not include an Uplink Pilot Time Slot (UpPTS).

In certain embodiments, the frame structure configuration may comprise an odd number of uplink subframes. The frame structure configuration may comprise a particular uplink subframe that is not part of an integer contiguous grouping of uplink subframes having a slot duration that is a multiple of 2 ms, the particular uplink subframe having a slot duration of 1 ms, wherein each slot includes three 3.75 kHz symbols. In certain embodiments, the method may comprise truncating uplink transmission using the particular uplink subframe.

In certain embodiments, the plurality of subframes may comprise at least three downlink subframes via which the wireless device can receive one or more reference signals and a control channel. In some cases, the one or more reference signals may comprise a Narrowband Primary Synchronization Signal and a Narrowband Secondary Synchronization Signal. The control channel may comprise a Narrowband Physical Broadcast Channel. In some cases, the frame structure configuration may be determined from a plurality of possible frame structure configurations, and the plurality of possible frame structure configurations from which the frame structure configuration is determined may be restricted to one or more legacy frame structure configurations comprising at least three downlink subframes via which the wireless device can receive the one or more reference signals and the control channel.

Figure 15:
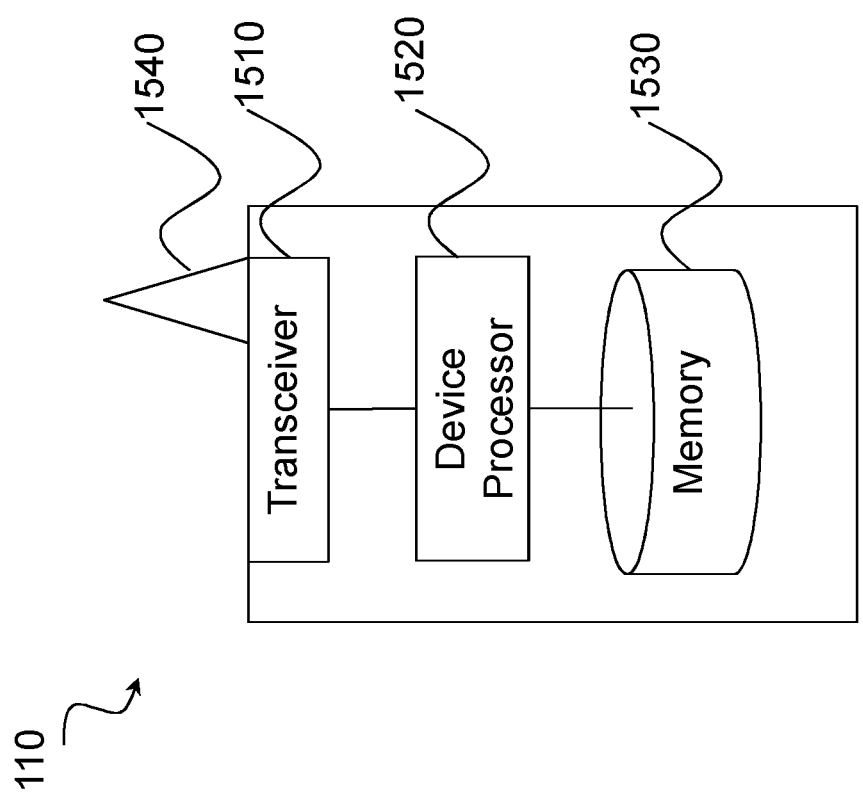
FIG. 15 is a schematic block diagram of an exemplary wireless device, in accordance with certain embodiments.

FIG. 15 is a block schematic of an exemplary wireless device, in accordance with certain embodiments. The wireless device 110 may refer to any type of wireless device communicating with a node and/or with another wireless device in a cellular or mobile communication system. Examples of the wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. The wireless device 110 may also be referred to as UE, a station (STA), a device, or a terminal in some embodiments. The wireless device 110 includes a transceiver 1510, a processor 1520, and a memory 1530. In some embodiments, transceiver 1510 facilitates transmitting wireless signals to and receiving wireless signals from network node 115, e.g., via antenna 1540, the processor 1520 executes instructions to provide some or all of the functionality described above as being provided by wireless device 110, and memory 1530 stores the instructions executed by processor 1520.

Processor 1520 may include any suitable combination of hardware and software implemented in one or more modules to execute instructions and manipulate data to perform some or all of the described functions of wireless device 110, such as the functions of wireless device 110 described above in relation to FIGS. 1-14. In some embodiments, the processor 1520 may include, for example, one or more computers, one or more central processing units (CPUs), one or more microprocessors, one or more applications, one or more application specific integrated circuits (ASICs), one or more field programmable gate arrays (FPGAs) and/or other logic.

The memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1520.

Other embodiments of the wireless device 110 may include additional components beyond those shown in FIG. 15 that may be responsible for providing certain aspects of the wireless device's functionality, including any of the functionality described above and/or any additional functionality, including any functionality necessary to support the solution described above. As just one example, the wireless device 110 may include input devices and circuits, output devices, and one or more synchronization units or circuits, which may be part of the processor 1520. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 16:
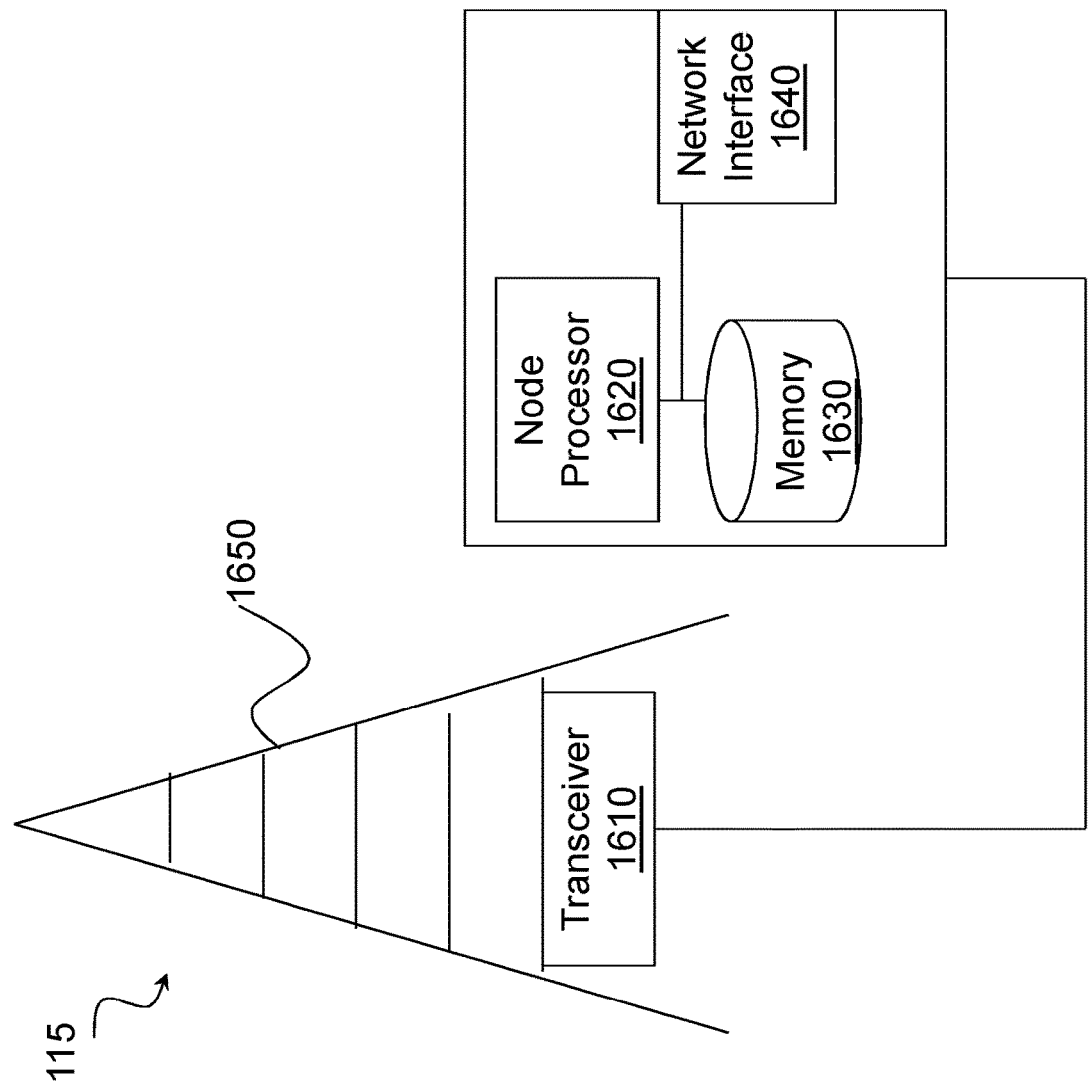
FIG. 16 is a schematic block diagram of an exemplary network node, in accordance with certain embodiments.

FIG. 16 is a block schematic of an exemplary network node such as the network node 115, in accordance with certain embodiments. The network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

The network node 115 may include one or more of transceiver 1610, processor 1620, memory 1630, and network interface 1640. In some embodiments, the transceiver 1610 facilitates transmitting wireless signals to and receiving wireless signals from the wireless device 110, e.g., via an antenna 1650, the processor 1620 executes instructions to provide some or all of the functionality described above as being provided by the network node 115, the memory 1630 stores the instructions executed by processor 1620, and the network interface 1640 communicates signals to backend network components, such as a gateway, switch, router, Internet, Public Switched Telephone Network (PSTN), the core network nodes or radio network controllers 130, etc.

The processor 1620 may include any suitable combination of hardware and software implemented in one or more modules to execute instructions and manipulate data to perform some or all of the described functions of the network node 115, such as those described above in relation to FIGS. 1-14 above. In some embodiments, processor 1620 may include, for example, one or more computers, one or more central processing units (CPUs), one or more microprocessors, one or more applications, and/or other logic.

The memory 1630 is generally operable to store instructions, such as a computer program, software, an application including one or more of logic, rules, algorithms, code, tables, etc. and/or other instructions capable of being executed by a processor. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 1640 is communicatively coupled to the processor 1620 and may refer to any suitable device operable to receive input for the network node 115, send output from the network node 115, perform suitable processing of the input or output or both, communicate to other devices, or any combination of the preceding. The Network interface 1640 may include appropriate hardware (e.g., port, modem, network interface card, etc.) and software, including protocol conversion and data processing capabilities, to communicate through a network.

Other embodiments of the network node 115 may include additional components beyond those shown in FIG. 16 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 17:
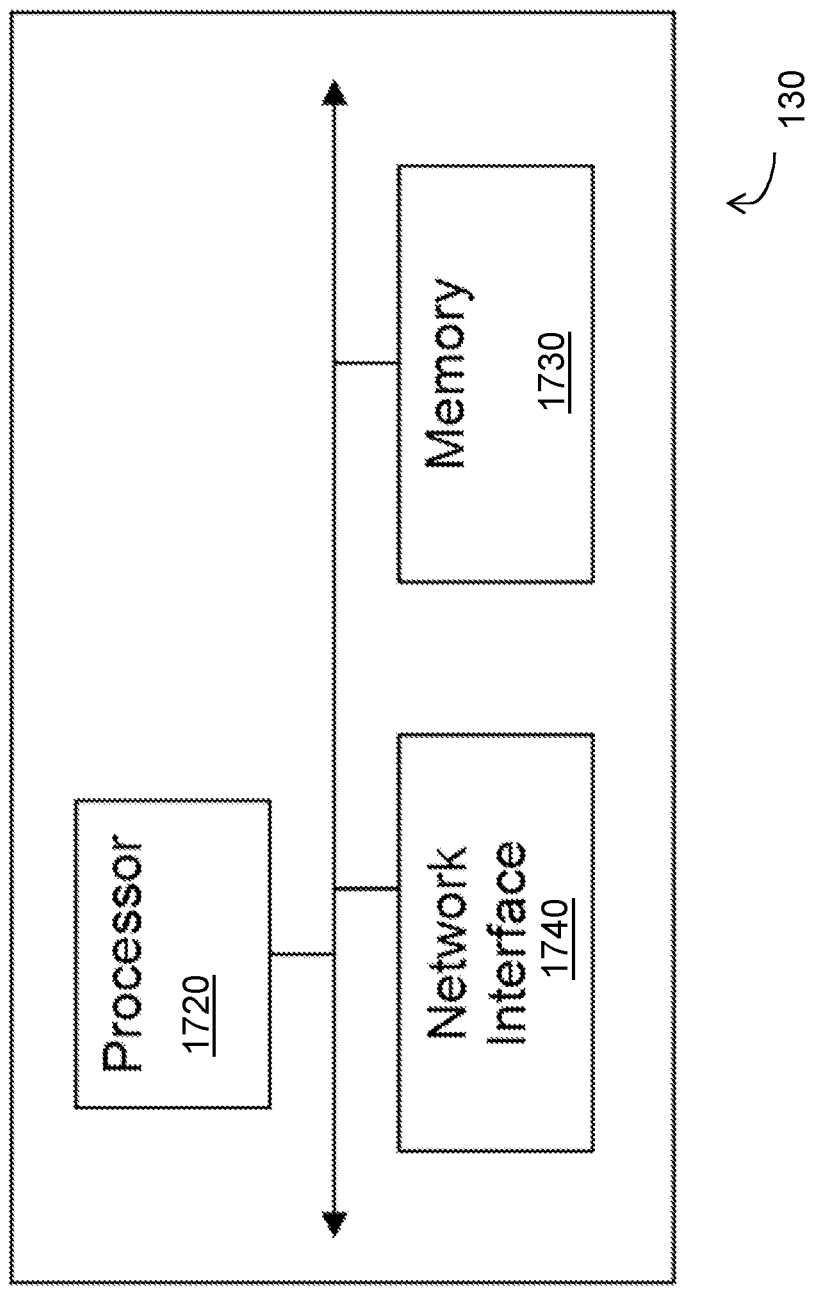
FIG. 17 is a schematic block diagram of an exemplary radio network controller or core network node, in accordance with certain embodiments.

FIG. 17 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes a processor 1720, a memory 1730, and a network interface 1740. In some embodiments, the processor 1720 executes instructions to provide some or all of the functionality described above as being provided by the network node 115, the memory 1730 stores the instructions executed by the processor 1720, and the network interface 1740 communicates signals to any suitable node, such as a gateway, switch, router, Internet, Public Switched Telephone Network (PSTN), network nodes 115, radio network controllers or core network nodes 130, etc.

The processor 1720 may include any suitable combination of hardware and software implemented in one or more modules to execute instructions and manipulate data to perform some or all of the described functions of the radio network controller or core network node 130. In some embodiments, processor 1720 may include, for example, one or more computers, one or more central processing units (CPUs), one or more microprocessors, one or more applications, and/or other logic.

The memory 1730 is generally operable to store instructions, such as a computer program, software, an application including one or more of logic, rules, algorithms, code, tables, etc. and/or other instructions capable of being executed by a processor. Examples of the memory 1730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 1740 is communicatively coupled to the processor 1720 and may refer to any suitable device operable to receive input for the network node, send output from the network node, perform suitable processing of the input or output or both, communicate to other devices, or any combination of the preceding. The network interface 1740 may include appropriate hardware (e.g., port, modem, network interface card, etc.) and software, including protocol conversion and data processing capabilities, to communicate through a network.

Other embodiments of the network node 115 may include additional components beyond those shown in FIG. 17 that may be responsible for providing certain aspects of the network node's functionality, including any of the functionality described above and/or any additional functionality, including any functionality necessary to support the solution described above.

Figure 18:
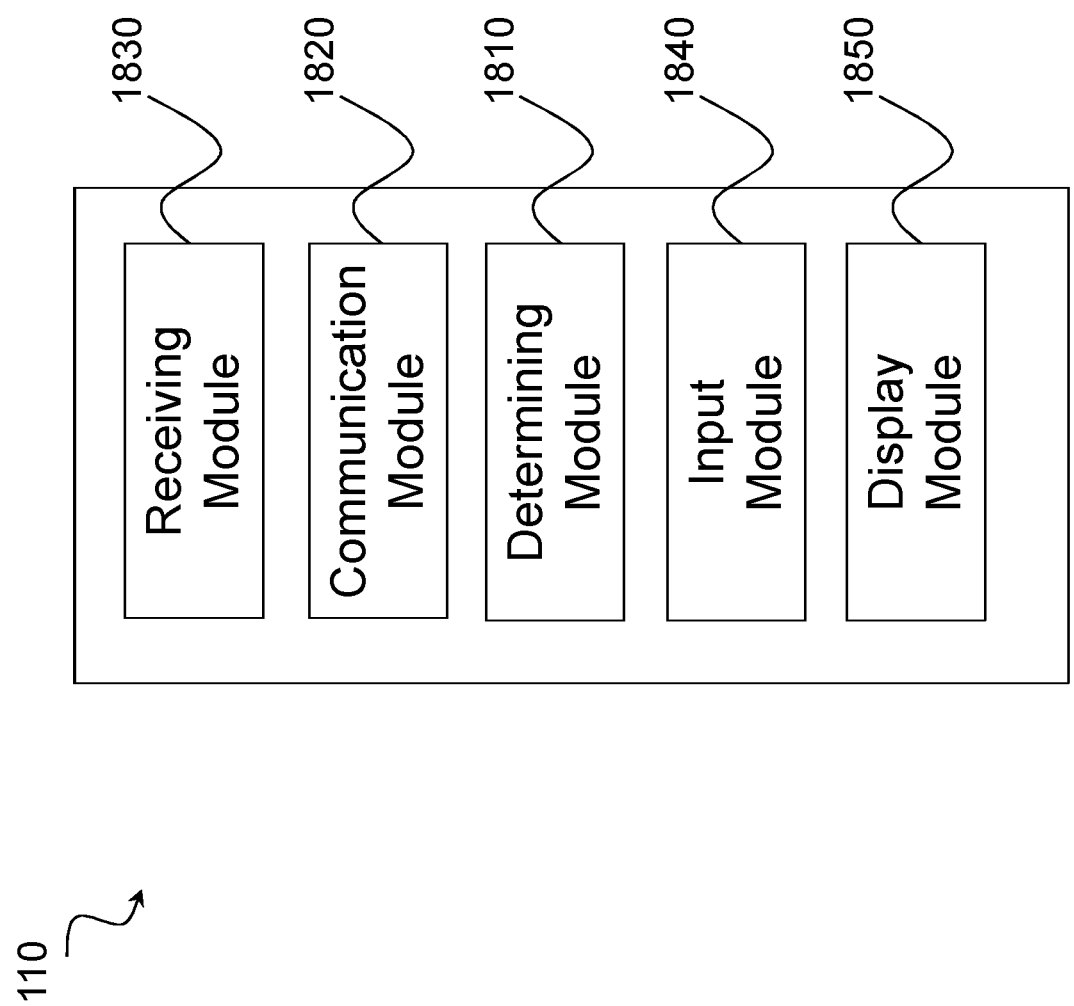
FIG. 18 is a block schematic of an exemplary wireless device, in accordance with certain embodiments.

FIG. 18 is a block schematic of an exemplary wireless device such as the wireless device 110, in accordance with certain embodiments. The wireless device 110 may include one or more modules. For example, wireless device 110 may include a determining module 1810, a communication module 1820, a receiving module 1830, an input module 1840, a display module 1850, and any other suitable modules. The wireless device 110 may perform the methods for TDD configuration for NB-IoT described above with respect to FIGS. 1-14.

The determining module 1810 may perform the processing functions of wireless device 110. For example, the determining module 1810 may truncate uplink transmission using the special subframe. The determining module 1810 may include or be included in one or more processors, such as the processor 1520 described above in relation to FIG. 15. The determining module 1810 may include analog and/or digital circuitry configured to perform any of the functions of the determining module 1810 and/or the processor 1520 described above. The functions of the determining module 1810 described above may, in certain embodiments, be performed in one or more distinct modules.

The communication module 1820 may perform the transmission functions of the wireless device 110. For example, the communication module 1820 may perform transmit operations according to the received frame structure configuration. The communication module 1820 may transmit messages to one or more of network nodes 115 of network 100. Communication module 1820 may include a transmitter and/or a transceiver, such as the transceiver 1510 described above in relation to FIG. 15. The communication module 1820 may include circuitry configured to wirelessly transmit messages and/or signals. In particular embodiments, the communication module 1820 may receive messages and/or signals for transmission from determining module 1810. In certain embodiments, the functions of the communication module 1820 described above may be performed in one or more distinct modules.

The receiving module 1830 may perform the receiving functions of the wireless device 110. For example, the receiving module 1830 may receive a frame structure configuration for a NB-IoT system operating in TDD mode. As another example, the receiving module 1830 may perform receive operations according to the received frame structure configuration. The receiving module 1830 may include a receiver and/or a transceiver, such as the transceiver 1510 described above in relation to FIG. 15. The receiving module 1830 may include circuitry configured to wirelessly receive messages and/or signals. In particular embodiments, the receiving module 1830 may communicate received messages and/or signals to determining module 1810.

The input module 1840 may receive user input intended for wireless device 110. For example, the input module 1840 may receive key presses, button presses, touches, swipes, audio signals, video signals, and/or any other appropriate signals. The input module 1840 may include one or more keys, buttons, levers, switches, touchscreens, microphones, and/or cameras. The input module may communicate received signals to the determining module 1810.

The display module 1850 may present signals on a display of the wireless device 110. The display module 1850 may include the display and/or any appropriate circuitry and hardware configured to present signals on the display. The display module 1850 may receive signals to present on the display from determining module 1810.

The determining module 1810, communication module 1820, receiving module 1830, input module 1840, and display module 1850 may include any suitable configuration of hardware and/or software. The wireless device 110 may include additional modules beyond those shown in FIG. 18 that may be responsible for providing any suitable functionality, including any of the functionality described above and/or any additional functionality (including any functionality necessary to support the various solutions described herein).

Figure 19:
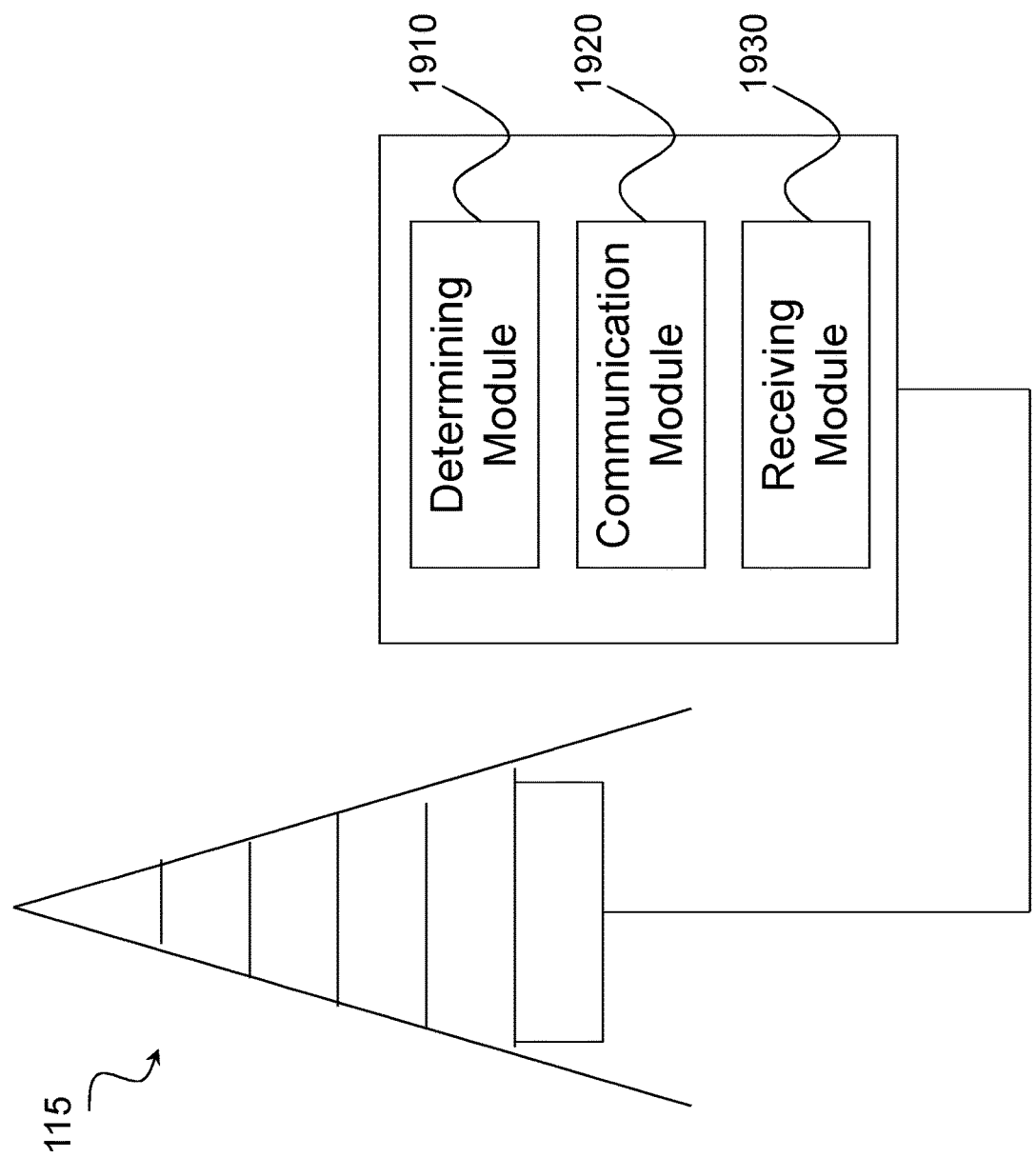
FIG. 19 is a block schematic of an exemplary network node, in accordance with certain embodiments.

FIG. 19 is a block schematic of an exemplary network node 115, in accordance with certain embodiments. Network node 115 may include one or more modules. For example, network node 115 may include determining module 1910, communication module 1920, receiving module 1930, and any other suitable modules. In some embodiments, one or more of determining module 1910, communication module 1920, receiving module 1930, or any other suitable module may be implemented using one or more processors, such as processor 1620 described above in relation to FIG. 16. In certain embodiments, the functions of two or more of the various modules may be combined into a single module.

Network node 115 may perform the methods for TDD configuration for NB-IOT described above with respect to FIGS. 1-14.

The determining module 1910 may perform the processing functions of network node 115. For example, the determining module 1910 may determine a frame structure configuration for a NB-IoT system operating in TDD mode. As another example, the determining module 1910 may restrict the plurality of possible frame structure configurations from which the frame structure configuration is determined to one or more legacy frame structure configurations comprising integer contiguous uplink subframes having a slot duration that is a multiple of 2 ms. As still another example, the determining module 1910 may configure the wireless device 110 to truncate UL transmission using the particular UL subframe. As yet another example, the determining module 1910 may restrict the plurality of possible frame structure configurations from which the frame structure configuration is determined to one or more legacy frame structure configurations comprising at least three downlink subframes via which the wireless device 110 can receive the one or more reference signals and the control channel.

The determining module 1910 may include or be included in one or more processors, such as the processor 1620 described above in relation to FIG. 16. The determining module 1910 may include an analog and/or digital circuitry configured to perform any of the functions of the determining module 1910 and/or the processor 1620 described above. The functions of the determining module 1910 may, in certain embodiments, be performed in one or more distinct modules. For example, in certain embodiments some of the functionality of the determining module 1910 may be performed by an allocation module.

The communication module 1920 may perform the transmission functions of network node 115. For example, the communication module 1920 may communicate the determined frame structure configuration to a wireless device such as the wireless device 110 operating in the NB-IoT system. The communication module 1920 may transmit messages to one or more of wireless devices 110. The communication module 1920 may include a transmitter and/or a transceiver, such as the transceiver 1610 described above in relation to FIG. 16. The communication module 1920 may include a circuitry configured to wirelessly transmit messages and/or signals. In particular embodiments, the communication module 1920 may receive messages and/or signals for transmission from the determining module 1910 or any other module.

The receiving module 1930 may perform the receiving functions of the network node 115. The receiving module 1930 may receive any suitable information from a wireless device such as the wireless device 110. The receiving module 1930 may include a receiver and/or a transceiver, such as the transceiver 1610 described above in relation to FIG. 16. The receiving module 1930 may include circuitry configured to wirelessly receive messages and/or signals. In particular embodiments, the receiving module 1930 may communicate received messages and/or signals to the determining module 1910 or any other suitable module.

The determining module 1910, the communication module 1920, and the receiving module 1930 may include any suitable configuration of hardware and/or software. The network node 115 may include additional modules beyond those shown in FIG. 19 that may be responsible for providing any suitable functionality, including any of the functionality described above and/or any additional functionality, including any functionality necessary to support the various solutions described herein.

SUMMARY OF EXAMPLE EMBODIMENTS

1. A method in a network node, comprising:
determining a frame structure configuration for a narrowband internet of things (NB-IoT) system operating in time division duplex (TDD) mode, the frame structure comprising a plurality of subframes, the plurality of subframes comprising at least one of each of a downlink subframe, an uplink subframe, and a special subframe comprising a gap period during which no transmission occurs, wherein the plurality of subframes are arranged such that the frame structure configuration is compatible with an uplink configuration of the NB-IoT system having, e.g. a subcarrier spacing of 3.75 kHz; and
communicating the determined frame structure configuration to a wireless device operating in the NB-IoT system.

2. The method of embodiment 1, wherein determining the frame structure configuration for the NB-IoT system operating in TDD mode comprises adapting a legacy Long Term Evolution (LTE) frame structure to be compatible with the uplink configuration of the NB-IoT system.

3. The method of embodiment 1, wherein the frame structure configuration comprises integer contiguous uplink subframes having a slot duration that is a multiple of 2 ms.

4. The method of embodiment 3, wherein:
the frame structure configuration is determined from a plurality of possible frame structure configurations; and
the method comprises restricting the plurality of possible frame structure configurations from which the frame structure configuration is determined to one or more legacy frame structure configurations comprising integer contiguous uplink subframes having a slot duration that is a multiple of 2 ms.

5. The method of embodiment 3, wherein the frame structure configuration comprises a single special subframe.

6. The method of embodiment 3, wherein any one out of a second subframe and a third subframe of the frame structure configuration is the special subframe.

7. The method of embodiment 1, wherein:
the special subframe comprises a Downlink Pilot Time Slot (DwPTS) and an Uplink Pilot Time Slot (UpPTS); and
the UpPTS has a duration that is an integer multiple of a 3.75 kHz symbol duration, the 3.75 kHz symbol duration equal to a duration of four 15 kHz Single Carrier Frequency Division Multiple Access (SC-FDMA) symbols.

8. The method of embodiment 7, wherein the UpPTS has a duration of one 3.75 kHz symbol.

9. The method of embodiment 7, wherein the UpPTS has a duration of two 3.75 kHz symbols.

10. The method of embodiment 7, wherein the UpPTS has a duration of three 3.75 kHz symbols.

11. The method of embodiment 1, wherein the special subframe does not include an Uplink Pilot Time Slot (UpPTS)

12. The method of embodiment 1, wherein the frame structure configuration comprises:
an odd number of uplink subframes; and
a particular uplink subframe that is not part of an integer contiguous grouping of uplink subframes having a slot duration that is a multiple of 2 ms, the particular uplink subframe having a slot duration of 1 ms, wherein each slot includes three 3.75 kHz symbols.

13. The method of embodiment 12, comprising:
configuring the wireless device to truncate uplink transmission using the particular uplink subframe.

14. The method of embodiment 1, wherein the plurality of subframes comprise at least three downlink subframes via which the wireless device can receive one or more reference signals and a control channel.

15. The method of embodiment 14, wherein:
the one or more reference signals comprise a Narrowband Primary Synchronization Signal and a Narrowband Secondary Synchronization Signal; and
the control channel comprises a Narrowband Physical Broadcast Channel.

16. The method of embodiment 14, wherein:
the frame structure configuration is determined from a plurality of possible frame structure configurations; and
the method comprises restricting the plurality of possible frame structure configurations from which the frame structure configuration is determined to one or more legacy frame structure configurations comprising at least three downlink subframes via which the wireless device can receive the one or more reference signals and the control channel.

17. A method in a wireless device, comprising:
receiving a frame structure configuration for a narrowband internet of things (NB-IoT) system operating in time division duplex (TDD) mode, the frame structure comprising a plurality of subframes, the plurality of subframes comprising at least one of each of a downlink subframe, an uplink subframe, and a special subframe comprising a gap period during which no transmission occurs, wherein the plurality of subframes are arranged such that the frame structure configuration is compatible with an uplink configuration of the NB-IOT system e.g. having a subcarrier spacing of 3.75 kHz; and
performing receive or transmit operations according to the received frame structure configuration.

18. The method of embodiment 17, wherein the frame structure configuration comprises integer contiguous uplink subframes having a slot duration that is a multiple of 2 ms.

19. The method of embodiment 18, wherein:
the frame structure configuration is determined from a plurality of possible frame structure configurations, and the plurality of possible frame structure configurations from which the frame structure configuration is determined is restricted to one or more legacy frame structure configurations comprising integer contiguous uplink subframes having a slot duration that is a multiple of 2 ms.

20. The method of embodiment 18, wherein the frame structure configuration comprises a single special subframe.

21. The method of embodiment 18, wherein any one out of a second subframe and a third subframe of the frame structure configuration is the special subframe.

22. The method of embodiment 17, wherein:
the special subframe comprises a Downlink Pilot Time Slot (DwPTS) and an Uplink Pilot Time Slot (UpPTS); and
the UpPTS has a duration that is an integer multiple of a 3.75 kHz symbol duration, the 3.75 kHz symbol duration equal to a duration of four 15 kHz Single Carrier Frequency Division Multiple Access (SC-FDMA) symbols.

23. The method of embodiment 22, wherein the UpPTS has a duration of one 3.75 kHz symbol.

24. The method of embodiment 22, wherein the UpPTS has a duration of two 3.75 kHz symbols.

25. The method of embodiment 22, wherein the UpPTS has a duration of three 3.75 kHz symbols.

26. The method of embodiment 17, wherein the special subframe does not include an Uplink Pilot Time Slot (UpPTS) 27. The method of embodiment 17, wherein the frame structure configuration comprises:
an odd number of uplink subframes; and
a particular uplink subframe that is not part of an integer contiguous grouping of uplink subframes having a slot duration that is a multiple of 2 ms, the particular uplink subframe having a slot duration of 1 ms, wherein each slot includes three 3.75 kHz symbols.

28. The method of embodiment 27, comprising:
truncating uplink transmission using the particular uplink subframe.

29. The method of embodiment 17, wherein the plurality of subframes comprise at least three downlink subframes via which the wireless device can receive one or more reference signals and a control channel.

30. The method of embodiment 29, wherein:
the one or more reference signals comprise a Narrowband Primary Synchronization Signal and a Narrowband Secondary Synchronization Signal; and
the control channel comprises a Narrowband Physical Broadcast Channel.

31. The method of embodiment 29, wherein:
the frame structure configuration is determined from a plurality of possible frame structure configurations, and the plurality of possible frame structure configurations from which the frame structure configuration is determined is restricted to one or more legacy frame structure configurations comprising at least three downlink subframes via which the wireless device can receive the one or more reference signals and the control channel.

32. A network node, comprising:
one or more processors, the one or more processors configured to: determine a frame structure configuration for a narrowband internet of things (NB-IoT) system operating in time division duplex (TDD) mode, the frame structure comprising a plurality of subframes, the plurality of subframes comprising at least one of each of a downlink subframe, an uplink subframe, and a special subframe comprising a gap period during which no transmission occurs, wherein the plurality of subframes are arranged such that the frame structure configuration is compatible with an uplink configuration of the NB-IoT system e.g. having a subcarrier spacing of 3.75 kHz; and
communicate the determined frame structure configuration to a wireless device operating in the NB-IoT system.

33. The network node of embodiment 32, wherein the one or more processors configured to determine the frame structure configuration for the NB-IoT system narrowband internet of things (NB-IoT) system comprise one or more processors configured to adapt a legacy Long Term Evolution (LTE) frame structure to be compatible with the uplink configuration of the NB-IoT system.

34. The network node of embodiment 32, wherein the frame structure configuration comprises integer contiguous uplink subframes having a slot duration that is a multiple of 2 ms.

35. The network node of embodiment 34, wherein:
the frame structure configuration is determined from a plurality of possible frame structure configurations; and
the one or more processors are configured to restrict the plurality of possible frame structure configurations from which the frame structure configuration is determined to one or more legacy frame structure configurations comprising integer contiguous uplink subframes having a slot duration that is a multiple of 2 ms.

36. The network node of embodiment 34, wherein the frame structure configuration comprises a single special subframe.

37. The network node of embodiment 34, wherein any one out of a second subframe and a third subframe of the frame structure configuration is the special subframe.

38. The network node of embodiment 32, wherein:
the special subframe comprises a Downlink Pilot Time Slot (DwPTS) and an Uplink Pilot Time Slot (UpPTS); and
the UpPTS has a duration that is an integer multiple of a 3.75 kHz symbol duration, the 3.75 kHz symbol duration equal to a duration of four 15 kHz Single Carrier Frequency Division Multiple Access (SC-FDMA) symbols.

39. The network node of embodiment 38, wherein the UpPTS has a duration of one 3.75 kHz symbol.

40. The network node of embodiment 38, wherein the UpPTS has a duration of two 3.75 kHz symbols.

41. The network node of embodiment 38, wherein the UpPTS has a duration of three 3.75 kHz symbols.

42. The network node of embodiment 32, wherein the special subframe does not include an Uplink Pilot Time Slot (UpPTS)

43. The network node of embodiment 32, wherein the frame structure configuration comprises:
an odd number of uplink subframes; and
a particular uplink subframe that is not part of an integer contiguous grouping of uplink subframes having a slot duration that is a multiple of 2 ms, the particular uplink subframe having a slot duration of 1 ms, wherein each slot includes three 3.75 kHz symbols.

44. The network node of embodiment 43, wherein the one or more processors are configured to:
configure the wireless device to truncate uplink transmission using the particular uplink subframe.

45. The network node of embodiment 32, wherein the plurality of subframes comprise at least three downlink subframes via which the wireless device can receive one or more reference signals and a control channel.

46. The network node of embodiment 45, wherein:
the one or more reference signals comprise a Narrowband Primary Synchronization Signal and a Narrowband Secondary Synchronization Signal; and
the control channel comprises a Narrowband Physical Broadcast Channel.

47. The network node of embodiment 45, wherein:
the frame structure configuration is determined from a plurality of possible frame structure configurations; and
the one or more processors are configured to restrict the plurality of possible frame structure configurations from which the frame structure configuration is determined to one or more legacy frame structure configurations comprising at least three downlink subframes via which the wireless device can receive the one or more reference signals and the control channel.

48. A wireless device, comprising:
one or more processors, the one or more processors configured to:
receive a frame structure configuration for a narrowband interne of things (NB-IoT) system operating in time division duplex (TDD) mode, the frame structure comprising a plurality of subframes, the plurality of subframes comprising at least one of each of a downlink subframe, an uplink subframe, and a special subframe comprising a gap period during which no transmission occurs, wherein the plurality of subframes are arranged such that the frame structure configuration is compatible with an uplink configuration of the NB-IOT system, e.g. having a subcarrier spacing of 3.75 kHz; and
perform receive or transmit operations according to the received frame structure configuration.

49. The wireless device of embodiment 48, wherein the frame structure configuration comprises integer contiguous uplink subframes having a slot duration that is a multiple of 2 ms.

50. The wireless device of embodiment 49, wherein:
the frame structure configuration is determined from a plurality of possible frame structure configurations, and the plurality of possible frame structure configurations from which the frame structure configuration is determined is restricted to one or more legacy frame structure configurations comprising integer contiguous uplink subframes having a slot duration that is a multiple of 2 ms.

51. The wireless device of embodiment 49, wherein the frame structure configuration comprises a single special subframe.

52. The wireless device of embodiment 49, wherein any one out of a second subframe and a third subframe of the frame structure configuration is the special subframe.

53. The wireless device of embodiment 48, wherein:
the special subframe comprises a Downlink Pilot Time Slot (DwPTS) and an Uplink Pilot Time Slot (UpPTS); and
the UpPTS has a duration that is an integer multiple of a 3.75 kHz symbol duration, the 3.75 kHz symbol duration equal to a duration of four 15 kHz Single Carrier Frequency Division Multiple Access (SC-FDMA) symbols.

54. The wireless device of embodiment 53, wherein the UpPTS has a duration of one 3.75 kHz symbol.

55. The wireless device of embodiment 53, wherein the UpPTS has a duration of two 3.75 kHz symbols.

56. The wireless device of embodiment 53, wherein the UpPTS has a duration of three 3.75 kHz symbols.

57. The wireless device of embodiment 48, wherein the special subframe does not include an Uplink Pilot Time Slot (UpPTS)

58. The wireless device of embodiment 48, wherein the frame structure configuration comprises:
an odd number of uplink subframes; and
a particular uplink subframe that is not part of an integer contiguous grouping of uplink subframes having a slot duration that is a multiple of 2 ms, the particular uplink subframe having a slot duration of 1 ms, wherein each slot includes three 3.75 kHz symbols.

59. The wireless device of embodiment 58, wherein the one or more processors are configured to truncate uplink transmission using the particular uplink subframe.

60. The wireless device of embodiment 48, wherein the plurality of subframes comprise at least three downlink subframes via which the wireless device can receive one or more reference signals and a control channel.

61. The wireless device of embodiment 60, wherein:
the one or more reference signals comprise a Narrowband Primary Synchronization Signal and a Narrowband Secondary Synchronization Signal; and
the control channel comprises a Narrowband Physical Broadcast Channel.

62. The wireless device of embodiment 60, wherein:
the frame structure configuration is determined from a plurality of possible frame structure configurations, and the plurality of possible frame structure configurations from which the frame structure configuration is determined is restricted to one or more legacy frame structure configurations comprising at least three downlink subframes via which the wireless device can receive the one or more reference signals and the control channel.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
BS Base Station
BSC Base Station Controller
BTS Base Transceiver Station
CDM Code Division Multiplexing
CPE Customer Premises Equipment
D2D Device-to-device
DAS Distributed Antenna System
DL Downlink
DwPTS Downlink Pilot Time Slot
EDGE Enhanced Data for GSM Evolution
eMTC Enhanced MTC
eNB evolved Node B
EPDCCH Enhanced Physical Downlink Control Channel
E-UTRA Evolved-UTRA
FDD Frequency Division Duplex
GERAN GSM EDGE Radio Access Network
GP Guard Period
GSM Global System for Mobile
IoT Internet of Things
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MSR Multi-standard Radio
MTC Machine-type communication
NAS Non-Access Stratum
NB-IoT Narrowband Internet of Things
NPBCH NB-IoT Physical Broadcast Channel
NPDCCH NB-IoT Physical Downlink Control Channel
NPDSCH NB-IoT Physical Downlink Shared Channel
NPUSCH NB-IoT Physical Uplink Shared Channel
NPRACH NB-IoT Physical Random Access Channel
NPSS NB-IoT Primary Synchronization Signal
NRS NB-IoT Reference Signals
NSSS NB-IoT Secondary Synchronization Signal
OFDM Orthogonal Frequency Division Multiplexing
PDCCH Physical Downlink Control Channel
PDSCH Physical Downlink Shared Channel
PRB Physical Resource Block
PSTN Public Switched Telephone Network
PUSCH Physical Uplink Shared Channel
PUCCH Physical Uplink Control Channel
RAT Radio Access Technology
RB Resource Block
RNC Radio Network Controller
RRC Radio Resource Control
RRH Remote Radio Head
RRU Remote Radio Unit
SC-FDMA Single-Carrier Frequency Division Multiple Access
TDD Time Division Duplex
UE User Equipment
UL Uplink
UMTS Universal Mobile Telecommunications System
UpPTS Uplink Pilot Time Slot
UTRA UMTS Terrestrial Radio Access
WAN Wide Area Network

The invention claimed is:

1. A method in a network node, comprising:
determining a frame structure configuration for a narrowband Internet of Things, NB-IoT, system operating in Time Division Duplex, TDD, mode, the frame structure comprising a plurality of subframes, the plurality of subframes comprising at least one of each of a downlink subframe, an uplink subframe, and a special subframe comprising a gap period during which no transmission occurs, wherein:
the plurality of subframes are arranged such that the frame structure configuration is compatible with an uplink configuration of the NB-IoT system, determining the frame structure configuration comprises one or more of:
adjusting a number of uplink subframes according to various NB data rates, such that the frame structure configuration is capable of transmitting at least eight continuous uplink subframes; and
shifting a position of a special subframe in the frame structure configuration, wherein shifting the position of the special subframe comprises positioning the special subframe to be a third subframe of the frame structure; and
communicating the determined frame structure configuration to a wireless device operating in the NB-IoT system.

2. The method of claim 1, wherein the plurality of subframes are arranged such that the frame structure configuration is compatible with an uplink configuration of the NB-IoT system having a subcarrier spacing of 3.75 kHz.

3. The method of claim 1, wherein determining the frame structure configuration for the NB-IoT system operating in TDD mode comprises adapting a legacy Long Term Evolution, LTE, frame structure to be compatible with the uplink configuration of the NB-IoT system.

4. The method of claim 1, wherein the frame structure configuration comprises integer contiguous uplink subframes having a slot duration that is a multiple of 2 ms.

5. The method of claim 4, wherein:
the frame structure configuration is determined from a plurality of possible frame structure configurations; and
the method comprises restricting the plurality of possible frame structure configurations from which the frame structure configuration is determined to one or more legacy frame structure configurations comprising integer contiguous uplink subframes having a slot duration that is a multiple of 2 ms.

6. The method of claim 4, wherein the frame structure configuration comprises a single special subframe.

7. The method of claim 4, wherein any one out of a second subframe and a third subframe of the frame structure configuration, is the Special subframe.

8. A method in a wireless device, comprising:
receiving a frame structure configuration for a narrowband Internet of Things, NB-IoT, system operating in Time Division Duplex, TDD, mode, the frame structure comprising a plurality of subframes, the plurality of subframes comprising at least one of each of a downlink subframe, an uplink subframe, and a special subframe comprising a gap period during which no transmission occurs, wherein:
the plurality of subframes are arranged such that the frame structure configuration is compatible with an uplink configuration of the NB-IoT system, the frame structure is configured such that one or more of:
a number of uplink subframes in the frame structure configuration is adjusted so that the frame structure configuration is capable of transmitting at least eight continuous uplink subframes; and
a special subframe in the frame structure configuration is positioned on a third subframe of the frame structure configuration; and
performing receive or transmit operations according to the received frame structure configuration.

9. The method of claim 8, wherein the plurality of subframes are arranged such that the frame structure configuration is compatible with an uplink configuration of the NB-IoT system having a subcarrier spacing of 3.75 kHz.

10. The method of claim 8, wherein the frame structure configuration comprises integer contiguous uplink subframes having a slot duration that is a multiple of 2 ms.

11. The method of claim 10, wherein:
the frame structure configuration is determined from a plurality of possible frame structure configurations, and the plurality of possible frame structure configurations from which the frame structure configuration is determined is restricted to one or more legacy frame structure configurations comprising integer contiguous uplink subframes having a slot duration that is a multiple of 2 ms.

12. A network node, comprising:
one or more processors, the one or more processors configured to:
determine a frame structure configuration for a narrowband Internet of Things, NB-IoT, system operating in Time Division Duplex, TDD, mode, the frame structure comprising a plurality of subframes, the plurality of subframes comprising at least one of each of a downlink subframe, an uplink subframe, and a special subframe comprising a gap period during which no transmission occurs, wherein:
the plurality of subframes are arranged such that the frame structure configuration is compatible with an uplink configuration of the NB-IoT system, determining the frame structure configuration comprises one or more of:
adjusting a number of uplink subframes according to various NB data rates, such that the frame structure configuration is capable of transmitting at least eight continuous uplink subframes; and
shifting a position of a special subframe in the frame structure configuration, wherein shifting the position of the special subframe comprises positioning the special subframe to be a third subframe of the frame structure; and
communicate the determined frame structure configuration to a wireless device operating in the NB-IoT system.

13. The network node of claim 12, wherein the plurality of subframes are arranged such that the frame structure configuration is compatible with an uplink configuration of the NB-IoT system having a subcarrier spacing of 3.75 kHz.

14. The network node of claim 12, wherein the one or more processors configured to determine the frame structure configuration for the NB-IoT system comprises one or more processors configured to adapt a legacy Long Term Evolution (LTE) frame structure to be compatible with the uplink configuration of the NB-IoT system.

15. The network node of claim 12, wherein the frame structure configuration comprises integer contiguous uplink subframes having a slot duration that is a multiple of 2 ms.

16. The network node of claim 15, wherein:
the frame structure configuration is determined from a plurality of possible frame structure configurations; and
the one or more processors are configured to restrict the plurality of possible frame structure configurations from which the frame structure configuration is determined to one or more legacy frame structure configurations comprising integer contiguous uplink subframes having a slot duration that is a multiple of 2 ms.

17. A wireless device, comprising:
one or more processors, the one or more processors configured to:
receive a frame structure configuration for a narrowband Internet of Things, NB-IoT, system operating in Time Division Duplex, TDD, mode, the frame structure comprising a plurality of subframes, the plurality of subframes comprising at least one of each of a downlink subframe, an uplink subframe, and a special subframe comprising a gap period during which no transmission occurs, wherein:
the plurality of subframes are arranged such that the frame structure configuration is compatible with an uplink configuration of the NB-IoT system, the frame structure is configured such that one or more of:
a number of uplink subframes in the frame structure configuration is adjusted so that the frame structure configuration is capable of transmitting at least eight continuous uplink subframes; and
a special subframe in the frame structure configuration is positioned on a third subframe of the frame structure configuration; and
perform receive or transmit operations according to the received frame structure configuration.

* * * * *